(12) United States Patent
Xiao et al.

(10) Patent No.: US 12,317,184 B2
(45) Date of Patent: May 27, 2025

(54) METHOD AND APPARATUS FOR MAPPING WIRELESS HOTSPOTS AND POINTS OF INTEREST, COMPUTER-READABLE STORAGE MEDIUM, AND COMPUTER DEVICE

(71) Applicant: Tencent Technology (Shenzhen) Company Limited, Shenzhen (CN)

(72) Inventors: Qiuyong Xiao, Shenzhen (CN); Changwang Zhang, Shenzhen (CN); Xinying Huang, Shenzhen (CN); Jihong Zhang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 592 days.

(21) Appl. No.: 17/678,478

(22) Filed: Feb. 23, 2022

(65) Prior Publication Data
US 2022/0286956 A1    Sep. 8, 2022

Related U.S. Application Data

(63) Continuation of application No. PCT/CN2020/124594, filed on Oct. 29, 2020.

(30) Foreign Application Priority Data

Jan. 21, 2020 (CN) .......................... 202010072289.3

(51) Int. Cl.
*H04W 48/20* (2009.01)
*H04L 43/10* (2022.01)
(Continued)

(52) U.S. Cl.
CPC ............ *H04W 48/20* (2013.01); *H04L 43/10* (2013.01); *H04W 24/08* (2013.01); *H04W 48/18* (2013.01); *H04W 88/08* (2013.01)

(58) Field of Classification Search
None
See application file for complete search history.

(56) References Cited

U.S. PATENT DOCUMENTS

2018/0188043 A1* 7/2018 Chen .................. G06T 7/74
2018/0285779 A1 10/2018 Zhou et al.

FOREIGN PATENT DOCUMENTS

CN 103533501 A 1/2014
CN 106303955 A * 1/2017 ............ H04W 4/021
(Continued)

OTHER PUBLICATIONS

International Search Report and Written Opinion with English Translation for International Patent Application No. PCT/CN2020/124594 dated Jan. 27, 2021, 13 pages.
(Continued)

*Primary Examiner* — Andrew C Oh
(74) *Attorney, Agent, or Firm* — Crowell & Moring LLP

(57) ABSTRACT

This disclosure relates to a method and an apparatus for mapping wireless hotspots and points of interest (POIs), a computer-readable storage medium, and a computer device. The method includes: obtaining sniffing records, each of the sniffing records including data of wireless hotspots sniffed by sniffing devices; determining sniffing device overlap degrees between the wireless hotspots according to the sniffing records; determining, according to distances between the wireless hotspots and POIs, initial mapping probabilities between the wireless hotspots and the POIs; performing iterative propagation among the initial mapping probabilities based on the sniffing device overlap degrees, and obtaining target mapping probabilities between the wireless hotspots and the POIs when the iteration ends; and establishing a mapping between the wireless hotspots and the POIs according to the target mapping probabilities.

18 Claims, 11 Drawing Sheets

(51) Int. Cl.
*H04W 24/08* (2009.01)
*H04W 48/18* (2009.01)
*H04W 88/08* (2009.01)

(56) References Cited

FOREIGN PATENT DOCUMENTS

| CN | 109672980 A | * | 4/2019 | ............. H04W 4/02 |
|---|---|---|---|---|
| CN | 109890984 A | * | 6/2019 | ......... C12N 15/1003 |
| CN | 110100013 A | * | 8/2019 | ........... C12Q 1/6806 |
| CN | 110309434 A | | 10/2019 | |
| CN | 111093213 A | * | 5/2020 | ............. H04L 67/26 |
| CN | 111291145 A | | 6/2020 | |
| CN | 107895053 B | * | 9/2021 | ............. G06F 16/35 |
| CN | 108062408 B | * | 11/2021 | ............. G06F 16/29 |
| CN | 109472796 B | * | 2/2022 | ................ G06T 7/11 |
| RU | 2750706 C2 | * | 7/2021 | ............. G01N 33/48 |

OTHER PUBLICATIONS

Office Action for Chinese Patent Application No. 202010072289.3 dated Apr. 28, 2022, 6 pages.

* cited by examiner

METHOD AND APPARATUS FOR MAPPING WIRELESS HOTSPOTS AND POINTS OF INTEREST, COMPUTER-READABLE STORAGE MEDIUM, AND COMPUTER DEVICE

RELATED APPLICATION

This application is a continuation application of the International PCT Application No. PCT/CN2020/124594, filed with the China National Intellectual Property Administration, PRC on Oct. 29, 2020 which claims priority to Chinese Patent Application No. 202010072289.3, filed on Jan. 21, 2020, each of which is incorporated herein by reference in its entirety.

FIELD OF THE TECHNOLOGY

This application relates to the field of computer technologies, and in particular, to a method and an apparatus for mapping wireless hotspots and points of interest (POIs), a computer-readable storage medium, and a computer device.

BACKGROUND OF THE DISCLOSURE

With the continuous development and popularity of mobile Internet and mobile devices, the wireless hotspot has become one of the necessary facilities and services for individuals, families, and enterprises as well as in service industries such as catering, hotel, and retail. The wireless hotspot can provide Internet access services for users within a certain range of distance in the surroundings through a wireless local area network. If a user sniffs or connects a wireless hotspot, it can be considered that the user visits the POT where the wireless hotspot is located. Therefore, it is important for crowd activity pattern digging, store site selection, and transportation planning to construct a mapping relationship between wireless hotspots and POIs.

A conventional manner is mainly to construct a mapping relationship between wireless hotspots and POIs based on names. The mapping manner based on names requires that the names of the wireless hotspots and the POIs have strong relevance. However, in a practical scenario, there is little relevance between the names of most wireless hotspots defined by users and the names of POIs. Therefore, there are quite limited scenarios to which the mapping manner based on names can be applied.

SUMMARY

According to various embodiments of this disclosure, a method and an apparatus for mapping wireless hotspots and POIs, a computer-readable storage medium, and a computer device are provided.

A method for mapping wireless hotspots and POIs is provided, performed by a computer device, the method including:
  obtaining sniffing records, the sniffing records including data of wireless hotspots sniffed by sniffing devices;
  determining sniffing device overlap degrees according to the sniffing records;
  determining, according to distances between the wireless hotspots and corresponding POIs, initial mapping probabilities between the wireless hotspots and the corresponding POIs;
  performing iterative propagation among the initial mapping probabilities based on the sniffing device overlap degrees, and obtaining target mapping probabilities between the wireless hotspots and the POIs when the iteration ends; and
  establishing a mapping between the wireless hotspots and the POIs according to the target mapping probabilities.

An apparatus for mapping wireless hotspots and POIs is provided, the apparatus including:
  a hotspot relevance measurement module, configured to obtain sniffing records, the sniffing records including data of wireless hotspots sniffed by sniffing devices; and determine sniffing device overlap degrees according to the sniffing records;
  a mapping probability propagation module, configured to, determine, according to distances between the wireless hotspots and corresponding POIs, initial mapping probabilities between the wireless hotspots and the corresponding POIs; and perform iterative propagation among the initial mapping probabilities based on the sniffing device overlap degrees, and obtain target mapping probabilities between the wireless hotspots and the POIs when the iteration ends; and
  a hotspot and POI mapping module, configured to establish a mapping between the wireless hotspots and the POIs according to the target mapping probabilities.

A computer-readable non-transitory storage medium is provided, storing a computer program, the computer program, when executed by a processor, causing the processor to perform steps of the method for mapping wireless hotspots and POIs.

A computer device is provided, including a memory and a processor, the memory storing a computer program, the computer program, when executed by the processor, causing the processor to perform steps of the method for mapping wireless hotspots and POIs.

A computer program product or computer program is provided, the computer program product or computer program including computer instructions, and the computer instructions being stored in a computer-readable storage medium; and when a processor of an electronic device reads the computer instructions from the computer-readable storage medium and executes the computer instructions, the electronic device is caused to perform steps of the method for mapping wireless hotspots and POIs.

Details of one or more embodiments of this disclosure are provided in the accompanying drawings and descriptions below. Other features and advantages of this disclosure become obvious with reference to the specification, the accompanying drawings, and the claims.

BRIEF DESCRIPTION OF THE DRAWINGS

The accompanying drawings described herein are used to provide a further understanding of this disclosure, and form part of this disclosure. Exemplary embodiments of this disclosure and descriptions thereof are used to explain this disclosure, and do not constitute any inappropriate limitation to this disclosure. In the accompanying drawings.

DESCRIPTION OF EMBODIMENTS

To make the objectives, technical solutions, and advantages of this disclosure clearer, the following further describes this disclosure in detail with reference to the accompanying drawings and the embodiments. It is to be understood that the specific embodiments described herein are merely used to explain this disclosure but are not intended to limit this disclosure.

Figure 1:
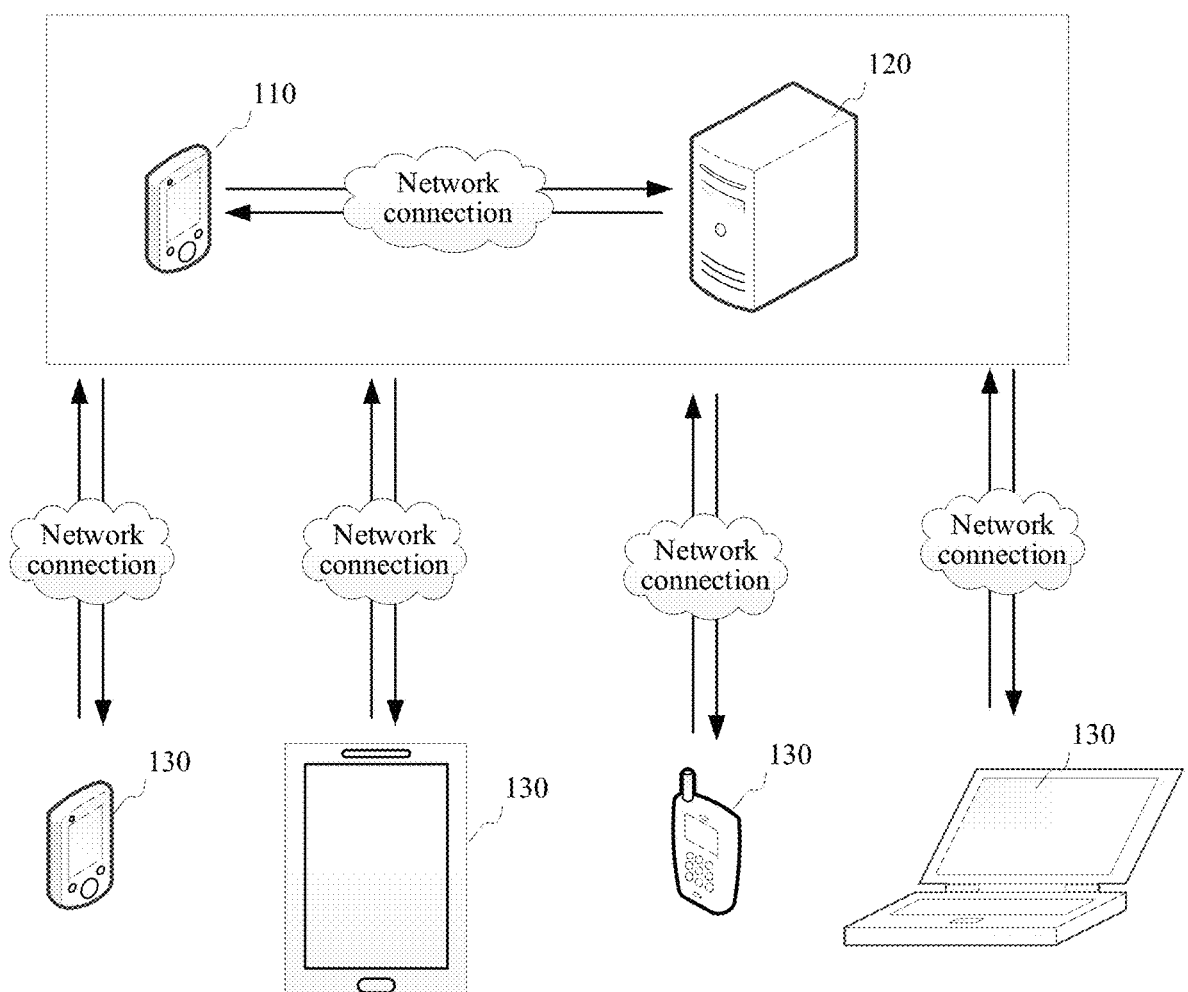
FIG. 1 is a diagram of an example application environment of a method for mapping wireless hotspots and POIs according to an embodiment.

FIG. 1 is a diagram of an exemplary application environment of a method for mapping wireless hotspots and POIs according to an embodiment. For example, referring to FIG. 1, the method for mapping wireless hotspots and POIs is applied to a system for mapping wireless hotspots and POIs. The system for mapping wireless hotspots and POIs includes a terminal 110, a server 120, and sniffing devices 130. The terminal 110 and the server 120 are connected by a network. The terminal 110 may be specifically a desktop terminal or a mobile terminal. The mobile terminal may be specifically at least one of a mobile phone, a tablet computer, a notebook computer, a smart wearable device, or the like. The server 120 may be implemented by using an independent server or a server cluster that includes a plurality of servers. The sniffing devices 130 are devices having a function of sniffing and connecting a wireless hotspot, such as a mobile phone, a computer, a smart wearable device, an electronic reading device, or the like. The sniffing devices 130 are configured to directly report sniffing records of wireless hotspots to the terminal 110 or the server 120, or report the records to another storage device and to be pulled by the terminal 110 or the server 120 from the storage device. Both the terminal 110 and the server 120 may independently perform the method for mapping wireless hotspots and POIs provided in the embodiments of this disclosure based on the sniffing records. The terminal 110 and the server 120 may alternatively cooperate to perform the method for mapping wireless hotspots and POIs provided in the embodiments of this disclosure based on the sniffing records.

Figure 2:
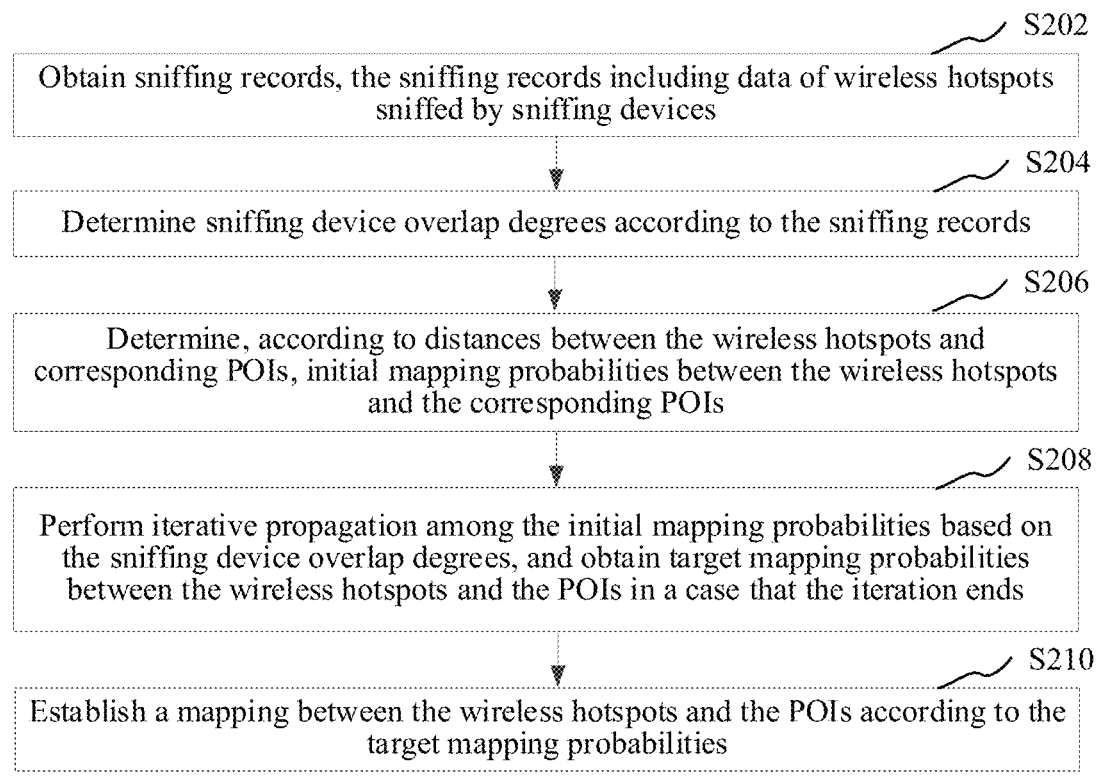
FIG. 2 is a flowchart of a method for mapping wireless hotspots and POIs according to an exemplary embodiment.

As shown in FIG. 2, in an embodiment, a method for mapping wireless hotspots and POIs is provided. This embodiment is mainly described by using an example in which the method is applied to a computer device. The computer device may be specifically the terminal 110 or the server 120 in the figure above. Referring to FIG. 2, the method specifically includes the following steps:

S202: Obtain sniffing records, the sniffing records including data of wireless hotspots sniffed by sniffing devices.

The sniffing records refer to data reported by sniffing devices when wireless hotspots are sniffed (or scanned). The sniffing records may also be referred to as scan record. The wireless hotspots may be a Wireless-Fidelity (Wi-Fi) network provided by a wireless access point (AP) or a router, or may be a mobile hotspot provided by a mobile terminal or other devices, such as a mobile phone Wi-Fi hotspot and a vehicular Wi-Fi hotspot. The sniffing devices may include devices which are capable of scanning and/or accessing hotspots. Each sniffing device may generate one or more sniffing records. For example, a sniffing device may generate a sniffing record for each predefined time interval such as one hour, 1 day, etc.

The sniffing records include device identifiers of the sniffing devices, generation time of the sniffing records, data of each wireless hotspot sniffed by the sniffing devices, or the like. The data of the wireless hotspots may include names, location coordinates, signal intensity of the wireless hotspots, and the like. The names of the wireless hotspots refer to service set identities (SSIDs) broadcast by the wireless hotspots, and may be specifically strings customized by users who provide the wireless hotspots, such as "TP-LINK-XX", "Guangming Residential Unit-13", or the like. The location coordinates of the wireless hotspots are spherical coordinates (lon, lat) that use longitudes and latitudes to indicate ground point locations of the wireless hotspots. Geographic coordinates may be specifically astronomical longitudes and latitudes, geodetic longitudes and latitudes, or geocentric longitudes and latitudes. For example, a sniffing record reported by a sniffing device A at time t1 may be [A, t1, (TP-LINK-YY, Guangming Residential Unit-13, 3-506A, Yuij99), [(114.32, 30.51), (110.22, 35.09), (11.32, 31.77), (109.92, 30.01)]].

When a user stays at a position or moves with a sniffing device, the sniffing device sniffs wireless hotspots existing in the surroundings, and presents sniffed wireless hotspots to the user in form of a list. The user may select one of the wireless hotspots to connect. Each sniffing device generates sniffing records based on data of the sniffed wireless hotspots at a preset time frequency, and reports the generated sniffing records to a specified device.

Specifically, the computer device pulls sniffing records in a statistical zone during a statistical period from the specified device through communication methods such as universal serial bus (USB) interface connection or network connection. The sniffing records may also be pushed by the sniffing devices to the computer device. The statistical zone is a geographic region in which wireless hotspots and POIs in this region need to be mapped. A regional boundary of the statistical zone may be freely defined according to statistical needs, such as the entire territory of a country, the territory of a province or a town, or the like. In a digital map, the statistic zone may be a region within a closed contour enclosed by a plurality of consecutive coordinate points. The statistical period refers to the time span of generation time of the depended sniffing records when the wireless hotspots and the POIs are mapped, including statistical start time and statistical end time. An excessively short time length of the statistical period affects the accuracy of mapping the wireless hotspots and the POIs, while an excessively long time length of the statistical period leads to an increased data calculation amount. The time length of the statistical period needs to be appropriately set according to needs, for example, 1 month.

In an embodiment, the computer device deletes obtained sniffing records that only include data of one wireless hotspot. It may be understood that, the sniffing records in this disclosure are used for measuring relevance between the wireless hotspots, and the sniffing records that only include data of a single wireless hotspot have no analytic value for measuring relevance between the wireless hotspots. The deletion of these sniffing records can reduce a data amount of to-be-processed sniffing records without affecting the accuracy of relevance analysis.

In an embodiment, the sniffing devices may also directly report the generated sniffing records to a computer device for mapping the wireless hotspots and the POIs.

In an embodiment, the wireless hotspots may alternatively be a point-to-point network provided by using a near field communication (NFC) method, such as bluetooth low energy (BLE), NFC, or radio frequency identification (RFID) wireless connection networks.

S204: Determine sniffing device overlap degrees according to the sniffing records.

The wireless hotspots have a corresponding range of sniffing distance, for example, around 50 meters. The wireless hotspots can be sniffed by any sniffing device within the range of sniffing distance. Therefore, wireless hotspots in close proximity may be sniffed by the same sniffing device, so that data of the same wireless hotspot may appear in a plurality of different sniffing records. Sniffing devices and wireless hotspots appearing in the same sniffing record may be considered in association. Sniffing devices associated with different wireless hotspots may overlap.

The sniffing device overlap degrees are values that can reflect the extent to which the sniffing devices associated with the wireless hotspots overlap. A sniffing device overlap degree between two wireless hotspots may be specifically a proportion of a quantity of overlapped sniffing devices in sniffing devices associated with the two wireless hotspots to a quantity of all sniffing devices associated with one of the wireless hotspots, or may be a proportion of a total quantity of de-duplicated sniffing devices associated with the two wireless hotspots to the quantity of all the sniffing devices associated with one of the wireless hotspots, or may be a proportion of the quantity of overlapped sniffing devices in the sniffing devices associated with the two wireless hotspots to the quantity of all the de-duplicated sniffing devices associated with the two wireless hotspots.

Specifically, the computer device determines wireless hotspots involved in the pulled sniffing records and sniffing devices associated with each of the wireless hotspots. The computer device counts a total quantity $NUM_i$ of sniffing devices associated with each wireless hotspot $Wi\text{-}Fi_i$. The computer device counts a quantity $NUM_{ij}$ of overlapped sniffing devices in sniffing devices associated with every two wireless hotspots $Wi\text{-}Fi_i$ and $Wi\text{-}Fi_j$. i and j are integers greater than 0.

The computer device may calculate a proportion of the quantity $NUM_{ij}$ of the overlapped sniffing devices to the total quantity $NUM_i$ of the sniffing devices associated with the wireless hotspot $Wi\text{-}Fi_i$, and use the proportion $NUM_{ij}/NUM_i$ as a sniffing device overlap degree $W_{ij}$ of the wireless hotspot $Wi\text{-}Fi_i$ relative to the wireless hotspot $Wi\text{-}Fi_j$. The computer device calculates a proportion of the quantity $NUM_{ij}$ of the overlapped sniffing devices to a total quantity $NUM_j$ of sniffing devices associated with the wireless hotspot $Wi\text{-}Fi_j$, and uses the proportion $NUM_{ij}/NUM_j$ as a sniffing device overlap degree $W_{ji}$ of the wireless hotspot $Wi\text{-}Fi_j$ relative to the wireless hotspot $Wi\text{-}Fi_i$.

In an embodiment, the computer device may also calculate a total quantity $NUM_i+NUM_j-NUM_{ij}$ of the sniffing devices associated with the wireless hotspots $Wi\text{-}Fi_i$ and $Wi\text{-}Fi_j$ after de-duplication, calculate a proportion of the total quantity $NUM_i+NUM_j-NUM_{ij}$ after de-duplication to the total quantity $NUM_i$ of the sniffing devices associated with the wireless hotspot $Wi\text{-}Fi_i$, and use the proportion $(NUM_i+NUM_j-NUM_{ij})/NUM_i$ as the sniffing device overlap degree $W_{ij}$ of the wireless hotspot $Wi\text{-}Fi_i$ relative to the wireless hotspot $Wi\text{-}Fi_j$. The computer device calculates a proportion of the total quantity $NUM_i+NUM_j-NUM_{ij}$ after de-duplication to the total quantity $NUM_j$ of the sniffing devices associated with the wireless hotspot $Wi\text{-}Fi_j$, and uses the proportion $(NUM_i+NUM_j-NUM_{ij})/NUM_j$ as the sniffing device overlap degree $W_{ji}$ of the wireless hotspot $Wi\text{-}Fi_j$ relative to the wireless hotspot $Wi\text{-}Fi_i$.

In an embodiment, the computer device calculates a proportion of the quantity $NUM_{ij}$ of the overlapped sniffing devices to the total quantity $NUM_i+NUM_j-NUM_{ij}$ of the sniffing devices associated with the wireless hotspots $Wi\text{-}Fi_i$ and $Wi\text{-}Fi_j$ after de-duplication, and uses the proportion $NUM_{ij}/(NUM_i+NUM_j-NUM_{ij})$ as a sniffing device overlap degree $W_{i+j}$ between the wireless hotspots $Wi\text{-}Fi_i$ and $Wi\text{-}Fi_j$. It may be understood that, in this manner, the sniffing device overlap degree $W_{ij}$ of the wireless hotspot $Wi\text{-}Fi_i$ relative to the wireless hotspot $Wi\text{-}Fi_j$ and the sniffing device overlap degree of the wireless hotspot $Wi\text{-}Fi_j$ relative to the wireless hotspot $Wi\text{-}Fi_i$ are the same, which are both the sniffing device overlap degree $W_{i+j}$.

In an embodiment, the sniffing records include sniffing device identifiers and hotspot names of at least two wireless hotspots; and determining sniffing device overlap degrees between the wireless hotspots includes: determining de-duplicated sniffing device sets (i.e., sniffing device set with no duplicate sniffing device record) corresponding to each of the hotspot names based on the sniffing device identifiers; identifying overlapped sniffing device identifiers in every two de-duplicated sniffing device sets; and determining, based on a quantity of the overlapped sniffing device identifiers and a quantity of sniffing device identifiers in the corresponding de-duplicated sniffing device sets, a sniffing device overlap degree between the corresponding two wireless hotspots.

The sniffing device identifiers are pieces of information that can uniquely identify a sniffing device. The sniffing device identifiers in the sniffing records may include identifier data that has been irreversibly encrypted by a data producer. The sniffing device identifiers may be specifically subscription permanent identifiers (SUPIs), generic public subscription identifiers (GPSIs), permanent equipment identifiers (PEIs), or the like. When the values of SUPIs are 0, the sniffing device identifiers may include international mobile subscriber identities (IMSIs). When the values of SUPIs are 1, the sniffing device identifiers may include network access identifiers (NAIs).

Sniffing device sets are sets including one or more sniffing devices, such as identifiers for the sniffing devices. Each of the sniffing device sets corresponds to the hotspot name of one wireless hotspot. The same sniffing device may report a plurality of sniffing records during the statistical period, and sniffing records reported for a plurality of times may include the same wireless hotspots. In this way, the sniffing device identifiers in the sniffing device sets corresponding to a wireless hotspot may overlap (or duplicate). The de-duplicated sniffing device sets are sniffing device sets after de-duplication performed on the sniffing device identifiers. Therefore, a de-duplicated sniffing device set does not include duplicate record.

Specifically, the computer device parses the pulled sniffing records, to construct sniffing device sets corresponding to each of the wireless hotspots involved. Although the same user may synchronously carry a plurality of sniffing devices, it may still be considered at a relatively high confidence level that each sniffing device may uniquely represent one user. Since the sniffing device identifiers are directly recorded in the sniffing records, users may be better distinguished based on the sniffing device identifiers. The computer device de-duplicates the sniffing device identifiers in the sniffing device sets, to obtain the de-duplicated sniffing device sets.

Further, the computer device performs a comparative analysis on every two de-duplicated sniffing device sets, to identify the overlapped sniffing device identifiers in the every two de-duplicated sniffing device sets. The computer device calculates and counts a quantity of the overlapped sniffing device identifiers, calculates a proportion of the quantity of the overlapped sniffing device identifiers to a total quantity of sniffing device identifiers in a de-duplicated sniffing device set corresponding to a target wireless hotspot in the two wireless hotspots, and uses the proportion as a sniffing device overlap degree between the target wireless hotspot relative to the other wireless hotspot. For example, after a comparative analysis is performed on a de-duplicated sniffing device set corresponding to Wi-Fi$_i$ and a de-duplicated sniffing device set corresponding to Wi-Fi$_j$, the sniffing device overlap degree $W_{ij}$ of the wireless hotspot Wi-Fi$_j$ relative to the wireless hotspot Wi-Fi$_i$=(a quantity of de-duplicated sniffing device identifiers of Wi-Fi$_i$+a quantity of de-duplicated sniffing device identifiers of Wi-Fi$_j$−a quantity of de-duplicated sniffing device identifiers of Wi-Fi$_i$ and Wi-Fi$_j$)/the quantity of the de-duplicated sniffing device identifiers of Wi-Fi$_i$.

In this embodiment, the relevance between the wireless hotspots may be measured based on the sniffing device overlap degrees. The values of the relevance obtained by calculating are within a range of [0, 1] and do not need to be normalized. More importantly, since each sniffing device may uniquely represent one user, the sniffing device overlap degrees reflect similarities between users of different wireless hotspots at a relatively high confidence level, which can help to determine the attributes of the users, such as a mobile user, a resident user, or the like. Therefore, by using the manner of measuring the relevance between the wireless hotspots based on the sniffing device overlap degrees, compared with using a manner simply based on the location coordinates of the wireless hotspots, or the number of times for which the wireless hotspots appearing in the same sniffing record is retained, spatial behavior feature information of the users is retained. As a result, differentiation of the wireless hotspots in terms of spatial location can be better implemented, thereby effectively resolving the problem of difficult differentiation of wireless hotspots between adjacent POIs, so that the reflected relevance between the wireless hotspots is more objective, stable, and of higher reliability.

S206: Determine, according to distances between the wireless hotspots and corresponding POIs, initial mapping probabilities between the wireless hotspots and the corresponding POIs.

The POIs refer to landmarks, attractions, or the like in a geographic information system, such as a government department in a region, a community building, commercial institutions (such as a gas station, a department store, a supermarket, a restaurant, a hotel, a convenience store, a mailbox, a hospital), places of interest, tourist attractions (such as a park and public restroom), transportation facilities (such as a station, a parking lot, a toll booth, a speed limit sign), or other places and objects.

Mapping probabilities refer to probabilities that the wireless hotspots are attributed and mapped to a certain POI. The initial mapping probabilities reflect the association between the wireless hotspots and the POIs in the dimension of spatial distance. In other words, simply in the dimension of spatial distance, the probabilities that the wireless hotspots are attributed and mapped to a corresponding POI are the initial mapping probabilities. It may be understood that, a plurality of wireless hotspots appearing in the same sniffing record are in proximity. The wireless hotspots in proximity have high overlap degrees of associated sniffing devices and are more likely to be attributed to the same POI.

Specifically, the computer device obtains data (or information) of POIs. The data of the POIs may be obtained from a third-party channel provider, or may be obtained through a web crawler. There is no limitation on the obtaining manner of the data of the POIs. The data of the POIs includes POI names, POI locations, or the like. The POI names are names people give to the POIs, such as "Starry Sky Primary School", "China Technology Exchange Building", or the like. The POI locations may be geographic coordinates of the POIs. The computer device calculates and counts distances between each of the wireless hotspots and the POIs in the statistical zone according to the geographic coordinates of the wireless hotspots and the geographic coordinates of the POIs.

Further, the computer device normalizes the distances between the wireless hotspots and the POIs, converts distance values into probability values that are in a range of [0, 1], and uses the probability values as the initial mapping probabilities between the wireless hotspots and the POIs. A manner adopted for normalization may be specifically 01 normalization, Z-score normalization, sigmoid function normalization, or the like. It may be understood that, the computer device may alternatively use another manner to determine the initial mapping probabilities between the POIs and the wireless hotspots. For example, the farthest distances between the wireless hotspots and the POIs in the statistical zone may also be determined. The ratios of distances between a current wireless hotspot and the POIs to the farthest distances are used as the initial mapping probabilities between the current wireless hotspot and the POIs.

In an embodiment, the POI locations may alternatively be address texts used for describing the locations of the POIs. the address texts are texts used for describing the geographic location information of the POIs, for example, "McDonald's, Haidian Street, Zhongguancun, Haidian District, Beijing". The computer device converts the address texts into the geographic coordinates of the POIs based on a geocoding service. The geographic coordinates obtained by the geocoding service are in a one-to-one correspondence with the address texts. The computer device may alternatively search for the geographic coordinates corresponding to each of the address texts based on a coordinate retrieval service.

The geographic coordinates obtained by the coordinate retrieval service may be in a one-to-one correspondence with the address texts, or may be in a many-to-one correspondence. In other words, one or more geographic coordinates corresponding to each of the address texts may be obtained based on the coordinate retrieval service. Different coordinate retrieval service providers provide different coordinate retrieval manners. For example, Baidu Map and Google Map provide different coordinate retrieval manners.

When there are a plurality of geographic coordinates obtained by converting, the computer device identifies key address elements in the address texts. The key address elements refer to address elements that can make address location information described by the address texts in a convergence state. The convergence state refers to a state in which a possible region can be accurately located among a large amount of scattered possible regions. The key address elements may be specifically POI prefixes that limit geographic locations from a large amount of POIs to one or several POIs thereof. For example, in the foregoing exemplified address texts, there are a large amount of POIs of "McDonald's" in Beijing. However, there are only a small amount of "Haidian Street McDonald's" or "Zhongguancun McDonald's". It indicates that Haidian Street or Zhongguancun is a key address element that can help with the convergence of the geographic location information described by the address texts. Therefore, the computer device can screen the plurality of geographic coordinates obtained by converting to obtain target geographic coordinates according to the key address elements.

S208: Perform iterative propagation among the initial mapping probabilities based on the sniffing device overlap degrees, and obtain target mapping probabilities between the wireless hotspots and the POIs when the iteration ends.

An objective of this disclosure is to establish a mapping relationship between the wireless hotspots and the POIs. In addition, it needs to be ensured that each wireless hotspot is only attributed and mapped to one POI, which is a problem of non-overlapping region partition. An algorithm for resolving the problem of non-overlapping region partition may specifically use region partition based on modularity optimization, region partition based on spectral analysis, region partition based on information theory, region partition based on label propagation, or the like. A region partition algorithm based on label propagation may be an LPA, a community overlap propagation algorithm (COPRA), a speaker-listener label propagation algorithm (SLPA), or the like.

Specifically, assuming that n wireless hotspots are found to be deployed in the statistical zone according to the pulled sniffing records generated during the statistical period in the statistical zone. According to the data of POIs, m POIs are found to be included in the statistical zone. When target mapping probabilities between target wireless hotspots Wi-Fi$_i$ (0≤i<n) and POIs POIj (0≤j<m) need to be calculated, based on the foregoing non-overlapping region partition algorithm, the computer device may use sniffing device overlap degrees respectively between other wireless hotspots other than the target wireless hotspots Wi-Fi$_i$ in the statistical zone and the target wireless hotspots Wi-Fi$_i$ as propagation weights, propagate and superimpose initial mapping probabilities between each of the other wireless hotspots in the statistical zone and the POIs POIj by the propagation weights onto initial mapping probabilities between the target wireless hotspots Wi-Fi$_i$ and the POIs POIj, to obtain intermediate mapping probabilities between the target wireless hotspots Wi-Fi$_i$ and the POIs POIj, and use the intermediate mapping probabilities as the initial mapping probabilities between the target wireless hotspots Wi-Fi$_i$ and the POIs POIj for iteration, until a preset iteration end condition is met. The iteration end condition may be that the intermediate mapping probabilities converge, or that a set maximum number of iterations are reached. The computer device determines the intermediate mapping probabilities obtained when the iteration ends as the target mapping probabilities between the corresponding wireless hotspots and POIs.

Taking the LPA as an example, the LPA is a semi-supervised learning method based on graphs. The basic idea is to use the label information of labeled nodes to predict the label information of unlabeled nodes. The relationship between samples is used to establish a complete graph model of the relationship. In the complete graph, nodes include labeled and unlabeled data, the sides of the nodes represent a similarity between two nodes, and the label of the nodes is passed to other nodes according to the similarity. Labeled data is like a source. Unlabeled data may be labeled. A greater similarity between nodes indicates that the label is easier to spread.

Figure 3:
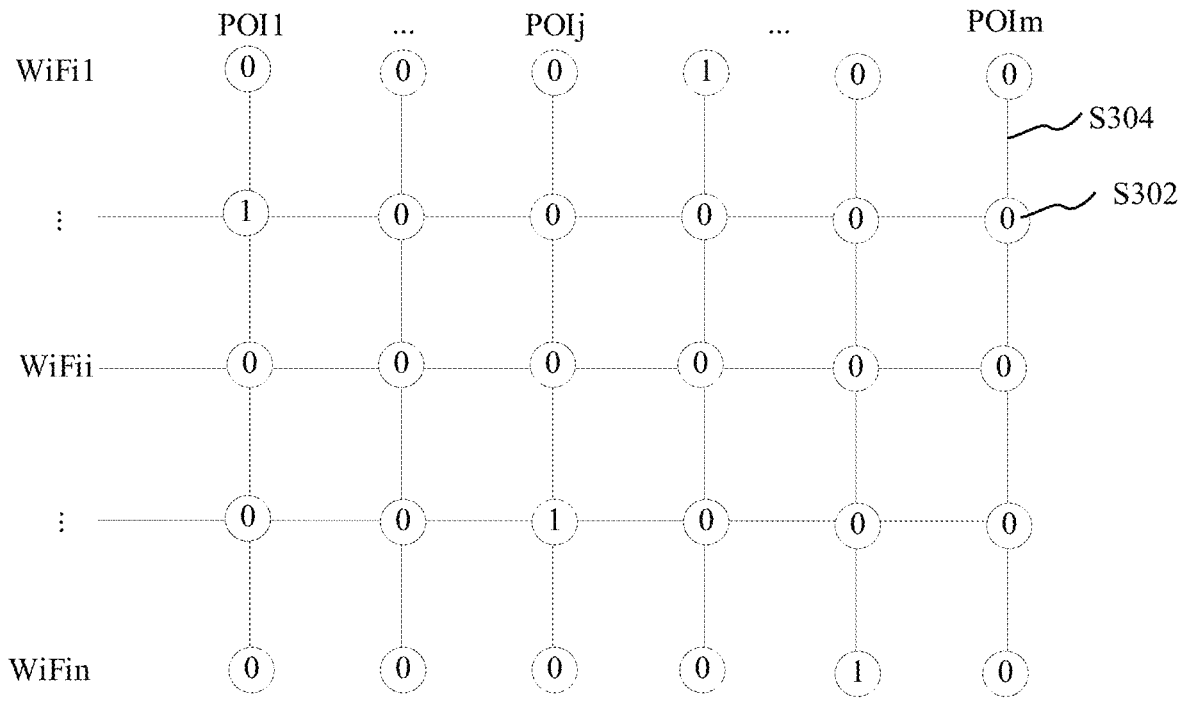
FIG. 3 is schematic diagram of a complete graph used in mapping probability propagation performed based on a label propagation algorithm (LPA) according to an exemplary embodiment.

Referring to FIG. 3, the computer device may build a complete graph by using each group of a to-be-mapped wireless hotspot and POI as a node 302. Each node in the complete graph has corresponding label information, and each connection side 304 used for connecting the nodes has a corresponding side weight. In the embodiments of this disclosure, the label information corresponding to the nodes refers to the initial mapping probabilities between the corresponding wireless hotspots and POIs, and the side weights corresponding to the connection sides between the nodes refer to the sniffing device overlap degree between the two corresponding wireless hotspots.

In an embodiment, the foregoing method for mapping wireless hotspots and POIs further includes: using the sniffing device overlap degrees between the wireless hotspots as matrix elements to establish a propagation matrix; and using the initial mapping probabilities between the wireless hotspots and the POIs as matrix elements to establish an initial mapping matrix, where the performing iterative propagation among the initial mapping probabilities based on the sniffing device overlap degrees, and obtaining target mapping probabilities between the wireless hotspots and the POIs when the iteration ends includes: multiplying the propagation matrix by the initial mapping matrix, to calculate a mapping matrix after probability propagation; and using the mapping matrix after probability propagation as the initial mapping matrix for iteration, and performing the iteration until an iteration end condition is met, to obtain a target mapping matrix, where the target mapping matrix records the target mapping probabilities between the wireless hotspots and the POIs.

Specifically, the computer device constructs an initialized propagation matrix according to the quantity of the wireless hotspots involved in the statistical zone. Assuming that n wireless hotspots are deployed in the statistical zone, the propagation matrix may be a two-dimensional n*n matrix $W_{n*n}$. Matrix elements $W_{ij}$ of the initialized propagation matrix $W_{n*n}$ are 0 by default. The matrix elements $W_{ij}$ are used for recording values reflecting relevance of the wireless hotspot Wi-Fi$_i$ relative to the wireless hotspot Wi-Fi$_j$. After obtaining the sniffing device overlap degrees between the wireless hotspots, the computer device uses the sniffing device overlap degrees as matrix elements to fill in the initialized propagation matrix $W_{n*n}$.

$L_{n*m}^0$. The superscript 0 represents that the mapping matrix is in an $L_{ij}^0$ of the initialized mapping matrix $L_{n*m}^0$ are 0 by default.

The matrix elements $L_{ij}^0$ are used for recording values reflecting relevance between the wireless hotspot Wi-Fi$_i$ and the POIs POI$_j$. After obtaining the initial mapping probabilities between the wireless hotspots and the POIs, the computer device uses the initial mapping probabilities as matrix elements to fill in the initialized mapping matrix $L_{n*m}^0$.

Further, the computer device multiplies the propagation matrix $W_{n*n}$ by the mapping matrix $L_{n*m}^0$ in an initialized state, to calculate a mapping matrix $L_{n*m}^1 = W_{n*n} L_{n*m}^0$ after probability propagation. The computer device uses the mapping matrix $L_{n*m}^1$ after probability propagation as the initial mapping matrix for iteration, and performs the iteration until an iteration end condition is met, to obtain a target mapping matrix $L_{n*m}^t = W_{n*n} L_{n*m}^{t-1}$. The target mapping matrix records the target mapping probabilities between the wireless hotspots and the POIs.

S210: Establish a mapping between the wireless hotspots and the POIs according to the target mapping probabilities.

Specifically, the target mapping probabilities reflect the probabilities that a wireless hotspot is attributed to a POI in terms of address location. The computer device determines POIs with a highest target mapping probability corresponding to each wireless hotspot, and records the POIs as target POIs. The computer device establishes a mapping between the wireless hotspots and the target POIs. In other words, the computer device establishes a mapping between the wireless hotspot Wi-Fi$_i$ and a POI corresponding to a largest element value in an i$^{th}$ row of the target mapping matrix.

In an embodiment, the establishing a mapping between the wireless hotspots and the POIs according to the target mapping probabilities includes: deleting wireless hotspots of which the target mapping probabilities are less than a second threshold from all POIs; and establishing a mapping between each remaining wireless hotspot and a corresponding POI with a highest target mapping probability.

The second threshold is a minimum value of a target mapping probability set for determining whether the wireless hotspot Wi-Fi$_i$ needs to be mapped to a certain POI. The value of the second threshold may be freely set according to needs.

Specifically, the computer device traverses whether target mapping probabilities between the wireless hotspot Wi-Fi$_i$ and each POI reach the second threshold. When the target mapping probabilities between the wireless hotspot Wi-Fi$_i$ and each POI are all less than the second threshold, the computer device determines the wireless hotspot Wi-Fi$_i$ as a noise Wi-Fi$_i$ and deletes the noise to establish a mapping between remaining wireless hotspots Wi-Fi$_{ii}$ and POIs with a target mapping probability that reaches the second threshold and is the highest. The mapping relationship between the wireless hotspots and the POIs established based on the method provided in this disclosure can realize the identification of users on site. In addition, the mapping relationship can be used for crowd activity pattern digging, thereby supporting many important business decisions and policy formulations such as store site selection, transportation planning, or the like, which has a very high application value.

In this embodiment, the deletion of the noise wireless hotspot whose target mapping probabilities with each POI are less than the second threshold can improve the accuracy and reliability of the established mapping relationship.

In the foregoing method for mapping wireless hotspots and POIs, the mapping relationship between the wireless hotspots and the POIs is established based on the sniffing records of the wireless hotspots. There is no need to manually collect and report POI visit data, which improves the mapping efficiency. In addition, due to the reduction of dependence on the wireless hotspots and the POI names, this mapping method is widely applicable, and the recall rate of the wireless hotspots is increased. The measurement of the relevance between the wireless hotspots based on the sniffing device overlap degrees can help to determine the mobility attribute of users among the POIs, and the spatial behavior feature information of the users is retained. As a result, differentiation of the wireless hotspots in terms of spatial location can be better implemented, so that the reflected relevance between the wireless hotspots is of higher reliability. Furthermore, the mapping between the wireless hotspots and the POIs is established by integrating the distances between the wireless hotspots and the POIs and the sniffing device overlap degrees between the wireless hotspots, which can improve the accuracy of the mapping.

In an embodiment, the foregoing method for mapping wireless hotspots and POIs further includes: identifying mobile hotspots in the wireless hotspots according to location changes of the wireless hotspots in different sniffing records; and deleting data about the mobile hotspots from each of the sniffing records; and determining sniffing device overlap degrees according to the sniffing records of the wireless hotspots includes: determining the sniffing device overlap degrees according to the sniffing records from which the data has been deleted.

The wireless hotspots may be divided into mobile hotspots and stable hotspots according to location mobility attributes thereof. The mobile hotspots are wireless hotspots whose locations change over time, such as mobile phone Wi-Fi hotspots, vehicular Wi-Fi hotspots, or the like. The mobile hotspots may be in the location of different POIs at different times, so that it is difficult to establish a stable mapping relationship between the mobile hotspots and the POIs.

Specifically, in order to improve the accuracy of the established mapping relationship between the wireless hotspots and the POIs, the computer device identifies mobile hotspots in the wireless hotspots involved in the statistical zone. There are many methods to identify the mobile hotspots and the stable hotspots. For example, the location coordinates of a wireless hotspot at different time points may be deduced according to the sniffing records during the statistical period. The values of location changes at adjacent time points are calculated. When there are a preset number of values of the location changes greater than a preset value, the wireless hotspot is determined as a mobile hotspot.

In an embodiment, the computer device may cluster the location coordinates of the wireless hotspots at different time points, calculate the clustering features of each of the geographic coordinates through a clustering algorithm, and determine a class cluster center point in the plurality of geographic coordinates according to the clustering features. The clustering features represent the clustering features, for example, Gaussian density distribution values, of the geographic coordinates. A larger Gaussian density distribution value indicates that corresponding geographic coordinates are more clustered and can be used as the class cluster center point. The class cluster center point refers to the most clustered geographic coordinate point among a plurality of geographic coordinate points. The clustering algorithm may be a k-means clustering algorithm, a fuzzy clustering algorithm, a density-based spatial clustering of application with noise (DBSCAN), or clustering by fast search and find of density peaks.

The computer device calculates a proportion of a quantity of geographic coordinates with a distance from the class cluster center point less than a target value to a total quantity of the geographic coordinates of the wireless hotspot at all time points. The proportion reflects the concentration of the geographic coordinates of the wireless hotspot at all time points. When the concentration is less than a preset value, the computer device determines the corresponding wireless hotspot as a mobile hotspot.

The computer device deletes the data about the mobile hotspots from each of the sniffing records, and then only needs to calculate sniffing device overlap degrees between the stable hotspots, and initial mapping probabilities and target mapping probabilities between the stable hotspots and the POIs, to establish the mapping between the hotspots and the POIs.

In this embodiment, according to the location changes of the wireless hotspots in different sniffing records, the mobile hotspots are identified, and noise data in the sniffing records is screened out. The stability of the established mapping relationship is improved. In addition, the amount of data that needs to be mapped is accurately reduced, thereby improving the mapping efficiency and saving the data processing resources of the computer device.

In an embodiment, the foregoing method for mapping wireless hotspots and POIs further includes: deleting wireless hotspots with a quantity of sniffing device identifiers less than a first threshold from the de-duplicated sniffing device sets, to obtain target de-duplicated sniffing device sets, where the identifying overlapped sniffing device identifiers in every two de-duplicated sniffing device sets includes: identifying overlapped sniffing device identifiers in every two remaining target de-duplicated sniffing device sets.

The first threshold is a minimum value of a quantity of sniffing device identifiers set for determining whether the wireless hotspot Wi-Fi$_i$ needs to be mapped to a certain POI. The value of the first threshold may be set according to implementation requirement.

Specifically, the computer device counts a quantity of the sniffing device identifiers in the sniffing device sets, to determine a quantity of visiting users corresponding to each of the wireless hotspots. The computer device traverses whether a quantity of the identifiers of the sniffing devices associated with each wireless hotspot Wi-Fi$_i$ reaches the first threshold. When the quantity of the identifiers of the sniffing devices associated with the wireless hotspot Wi-Fi$_i$ is less than the first threshold, the wireless hotspot may have malfunctioned at a certain time point during the statistical period, and thus cannot be detected by sniffing devices carried by visiting users. Alternatively, the wireless hotspot has relatively few visiting users. As a result, the computer device determines this wireless hotspot Wi-Fi$_i$ as a faulty hotspot or an unpopular hotspot. The computer device filters out the fault hotspot and the unpopular hotspot. Only sniffing device overlap degrees between the remaining wireless hotspots Wi-Fi$_{ii}$ and initial mapping probabilities and target mapping probabilities between the remaining wireless hotspots and the POIs need to be calculated subsequently, to establish the mapping between the remaining wireless hotspots and the POIs.

In this embodiment, the wireless hotspot with a small amount of sniffing device identifiers is excluded from the scope of statistics for the sniffing device overlap degrees, which improves the accuracy of the sniffing device overlap degrees. In addition, the dimension of the propagation matrix $W_{n*n}$ is reduced, thereby helping to improve the mapping efficiency.

In an embodiment, the calculating, according to distances between the wireless hotspots and POIs, initial mapping probabilities between the wireless hotspots and the corresponding POIs includes: selecting wireless hotspots with a distance from the POIs less than a preset value by screening as seed hotspots of the corresponding POIs; determining initial mapping probabilities between the seed hotspots and the corresponding POIs to be 1; and determining initial mapping probabilities between wireless hotspots other than the seed hotspots and the POIs to be 0.

The preset value is a maximum value of a distance preset for determining whether a wireless hotspot may be used as a seed hotspot of a certain POI. The seed hotspots are wireless hotspots with a distance from at least one POI less than the preset value. POIs to which the seed hotspots are attributed may be determined according to the distance alone at a relatively high confidence level. In fact, for the seed hotspots, the computer device can establish the mapping between the seed hotspots and the corresponding POIs at this point. The wireless hotspots other than the seed hotspots may be referred to as to-be-mapped hotspots. The to-be-mapped hotspots are wireless hotspots with a distance from each of the POIs greater than or equal to the preset value. POIs to which the to-be-mapped hotspots are attributed cannot be determined according to the distance alone.

It is worth emphasizing that, each of the POIs may have a plurality of corresponding seed hotspots. However, each of the wireless hotspots can merely serve as the seed hotspot of one POI.

In other words, in a row of the initialized mapping matrix $L_{n*m}^0$, an initial mapping probability between the wireless hotspot Wi-Fi$_i$ and at most one POI is 1. When distances between one wireless hotspot and a plurality of POIs are less than the preset value, the wireless hotspot may be determined as the seed hotspot of the closest POI It is easy to find that the preset value is a threshold used for determining the seed hotspots, and each of the wireless hotspots can merely serve as the seed hotspot of one POI. Therefore, the preset value shall not be excessively high, and may be a distance value far smaller than the radiation range of the wireless hotspots, for example, 20 m.

Specifically, the computer device determines numbers corresponding to each of the POIs. The numbers may be in a range from 0 to m−1. m is the quantity of the POIs included in the statistical zone. The numbers may be randomly determined by the computer device, or may be determined according to the location coordinates of the POIs, for example, in descending order of longitudes and/or latitudes. In this way, the POI group numbers may be directly used as the column subscripts of the mapping matrix $L_{n*m}^0$.

Further, the computer device traverses whether distances between each wireless hotspot Wi-Fi$_i$ and the POIs POIj are less than the preset value according to the POI group numbers. When the distances between the wireless hotspot Wi-Fi$_i$ and the POIs POIj are greater than or equal to the preset value, the computer device sets initial mapping probabilities between the wireless hotspot Wi-Fi$_i$ and the POIs POIj to 0. When the distances between the wireless hotspot Wi-Fi$_i$ and the POIs POIj are less than the preset value, the computer device sets the initial mapping probabilities between the wireless hotspot Wi-Fi$_i$ and the POIs POIj to 1, and sets initial mapping probabilities between the wireless hotspot Wi-Fi$_i$ and POIs POIj+k to 0. In other words, when the wireless hotspot $Wi\text{-}Fi_i$ is determined as the seed hotspot of a POI $POIj$, there is no need to determine whether distances between the POIs $POIj+k$ after the POI $POIj$ and the wireless hotspot $Wi\text{-}Fi_i$ are less than the preset value. $j+k \leq m-1$.

Figure 4:
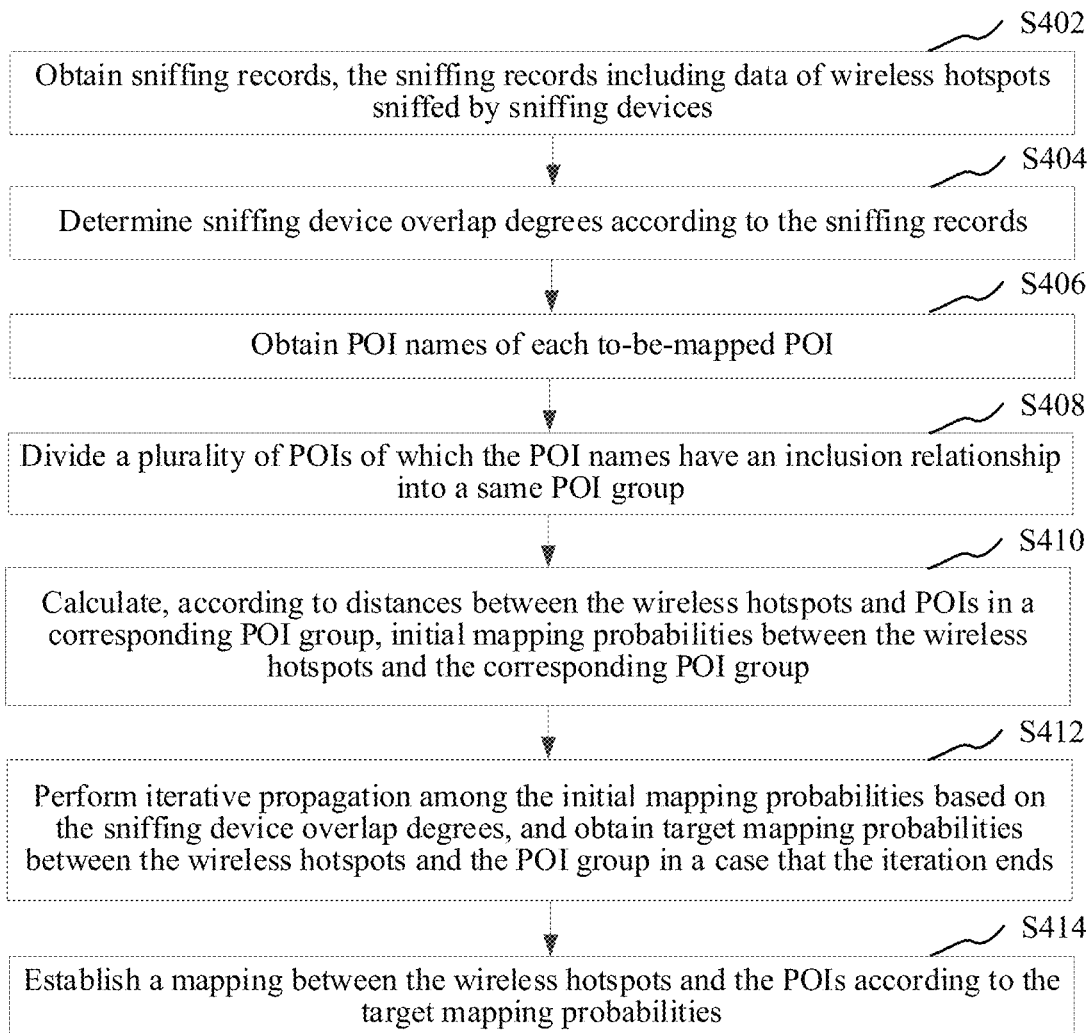
FIG. 4 is a flowchart of a method for mapping wireless hotspots and POIs according to another exemplary embodiment.

In an embodiment, referring to FIG. 4, the foregoing method for mapping wireless hotspots and POIs includes:

S402: Obtain sniffing records, the sniffing records including data of wireless hotspots sniffed by sniffing devices.

S404: Determine sniffing device overlap degrees according to the sniffing records.

S406: Obtain POI names of each to-be-mapped POI.

S408: Divide a plurality of POIs of which the POI names have an inclusion relationship into a same POI group.

S410: Calculate, according to distances between the wireless hotspots and POIs in a corresponding POI group, initial mapping probabilities between the wireless hotspots and the corresponding POI group.

S412: Perform iterative propagation among the initial mapping probabilities based on the sniffing device overlap degrees, and obtain target mapping probabilities between the wireless hotspots and the POI group when the iteration ends.

S414: Establish a mapping between the wireless hotspots and the POI group according to the target mapping probabilities.

The POI names include one or more address elements. For example, a POI "Building 1, East Guangming Residential Unit" includes three address elements that are "Guangming Residential Unit", "East", and "Building 1". In a real scenario, there is a level relationship between the POIs, and the level relationship is reflected in the inclusion relationship between the POI names. The inclusion relationship between the POI names refers to that one POI name is one or more address elements of another POI name. For example, a POI "Guangming Residential Unit" is included in the POI "Building 1, East Guangming Residential Unit". It is easy to understand that only inter-word comparison rather than word splitting performed on the POI names is needed to determine whether the POI names have an inclusion relationship.

Specifically, the computer device traverses whether each of the POI names is included in another POI name. When a POI name $POIi$ is included in a POI name $POIj$, the computer device determines a POI corresponding to the POI name $POIi$ as a parent POI of a POI corresponding to the POI name $POIj$, and determines the POI corresponding to the POI name $POIj$ as a child POI of the POI corresponding to the POI name $POIi$. The POI group includes POIs having a parent-child relationship. For example, a POI group {"Guangming Residential Unit", "Building 1, East Guangming Residential Unit", "Building 3, East Guangming Residential Unit", . . . } includes a parent POI "Guangming Residential Unit" and corresponding child POIs "Building 1, East Guangming Residential Unit", "Building 3, East Guangming Residential Unit", or the like. another word, a parent POI may be a sub-string of a child POI.

In an embodiment, the same POI group may include multi-level POIs, that is, a child POI may be used as a parent POI of other POIs. For example, in {"Guangming Residential Unit", "East Guangming Residential Unit", "Building 1, East Guangming Residential Unit", "Building 3, East Guangming Residential Unit", . . . }, "East Guangming Residential Unit" is the child POI of "Guangming Residential Unit", and is the parent POI of "Building 1, East Guangming Residential Unit" and "Building 3, East Guangming Residential Unit" at the same time. When the POI group includes multi-level POIs, the computer device determines a POI of the highest level as a parent POI of the POI group.

In an embodiment, when relatively many POI names are involved in the statistical zone, the computer device may alternatively divide the plurality of POI names into a plurality of groups, synchronously perform level division on each group of POI names according to the foregoing manner, and merge the result of the level division on each group, to determine a final POI level relationship in the statistical zone.

In this way, the computer device may map the wireless hotspots and the POIs by POI group. Specifically, according to distances between the wireless hotspots and POIs in a POI group, the computer device calculates initial mapping probabilities between the wireless hotspots and the corresponding POI group. For example, according to a shortest distance or an average distance between the wireless hotspot $Wi\text{-}Fi_i$ and POIs in a POI group $\{POIi\}$, the computer device may calculate initial mapping probabilities between the wireless hotspot and the corresponding POI group $\{POIi\}$. According to the foregoing manner, the computer device performs iteration propagation on initial mapping probabilities between the wireless hotspots and the corresponding POI group $\{POIi\}$ based on the sniffing device overlap degrees, to obtain target mapping probabilities between the wireless hotspots and the corresponding POI group $\{POIi\}$, and establishes a mapping between the wireless hotspot $Wi\text{-}Fi_i$ and each POI in one POI group $\{POIi\}$ with a highest target mapping probability.

When the minimum value of a target mapping probability of mapping a wireless hotspot $Wi\text{-}Fi_i$ to a certain POI is limited, that is, the second threshold, the computer device traverses whether target mapping probabilities between the wireless hotspot $Wi\text{-}Fi_i$ and each POI group $\{POIi\}$ reach the second threshold. When the target mapping probabilities between the wireless hotspot $Wi\text{-}Fi_i$ and each POI group $\{POIi\}$ are all less than the second threshold, the computer device determines the wireless hotspot $Wi\text{-}Fi_i$ as a noise $Wi\text{-}Fi_i$ and deletes the noise to establish a mapping between remaining wireless hotspots $Wi\text{-}Fi_{ii}$ and each POI in a POI group $\{POIi\}$ with a target mapping probability that reaches the second threshold and is the highest.

Figure 5:
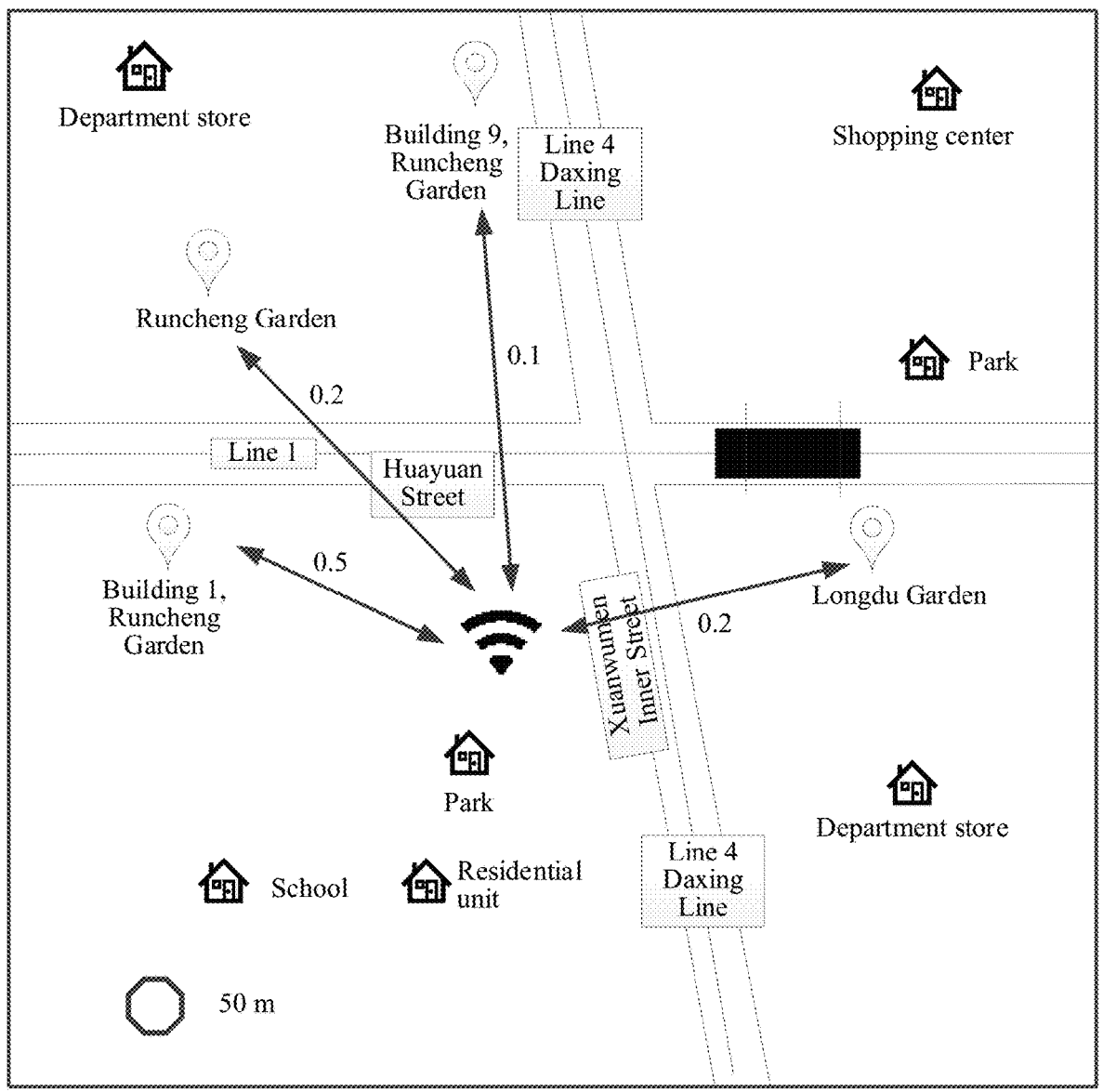
FIG. 5 is a schematic principle diagram of introducing a level relationship of a POI according to an exemplary embodiment.

The mapping between the wireless hotspots and the POIs is implemented based on the target mapping probabilities between the wireless hotspots and the POIs. Assuming that the second threshold of the target mapping probabilities of establishing the mapping between the wireless hotspots and the POIs is 0.7. Referring to FIG. 5, a target mapping probability between the wireless hotspot $Wi\text{-}Fi_i$ and a POI "Runcheng Garden" is 0.2, a target mapping probability between the wireless hotspot $Wi\text{-}Fi_i$ and a POI "Building 1, Runcheng Garden" is 0.5, a target mapping probability between the wireless hotspot $Wi\text{-}Fi_i$ and a POI "Building 9, Runcheng Garden" is 0.1, and a target mapping probability between the wireless hotspot $Wi\text{-}Fi_i$ and a POI "Longdu Garden" is 0.2. Before introducing the POI level relationship, the target mapping probabilities of the wireless hotspot $Wi\text{-}Fi_i$ are diluted by the plurality of POIs nearby, resulting in small probability values of mapping to each POI, so that the wireless hotspot $Wi\text{-}Fi_i$ is deleted. Therefore, the recall rate of the wireless hotspot $Wi\text{-}Fi_i$ is low.

However, in the embodiments of this disclosure, by introducing the POI level relationship, "Building 1, Runcheng Garden", "Building 9, Runcheng Garden", and "Runcheng Garden" may be divided into the same POI group {"Runcheng Garden", "Building 1, Runcheng Garden", "Building 9, Runcheng Garden"}. A final probability obtained of mapping Runcheng Garden to {"Runcheng Garden", "Building 1, Runcheng Garden", "Building 9, Runcheng Garden"} is 0.8, and "Runcheng Garden" is recalled. Therefore, the introducing of the POI level relationship can improve the recall rate of mapping the wireless hotspots Wi-Fi and the POIs.

It may be understood that, after introducing the POI level relationship, assuming that m POIs included in the statistical zone are divided into p POI groups, the dimension of the foregoing $L_{n*m}^0$ may be reduced to $L_{n*p}^0$, where m≥p. Therefore, the introducing of the POI level relationship can also reduce the mapping matrix dimension in the iterative propagation of the initial mapping probabilities, mitigating the impact of data skewing, greatly reducing the calculation amount, and improving the stability of the established mapping relationship.

In this embodiment, the grouping of the POIs according to the POI names and the introducing of the POI level relationship can implement mapping between the wireless hotspots and the POIs by POI group, which improves the mapping efficiency. In a scenario in which the second threshold of the target mapping probabilities is limited, the introducing of the POI level relationship can also improve the recall rate of mapping the wireless hotspots Wi-Fi and the POIs.

In an embodiment, the performing iterative propagation among the initial mapping probabilities based on the sniffing device overlap degrees, and obtaining target mapping probabilities between the wireless hotspots and the POIs when the iteration ends includes: multiplying the propagation matrix by the initial mapping matrix, to calculate an intermediate mapping matrix; and resetting intermediate mapping probabilities between the seed hotspots and the corresponding POIs in the intermediate mapping matrix to 1, and performing iteration by using the intermediate mapping probabilities as the initial mapping matrix, until an iteration end condition is met, to obtain a target mapping matrix, where the target mapping matrix records the target mapping probabilities between the wireless hotspots and the POIs.

$L_{n*m}^0$ in an initialized state, to calculate the intermediate mapping matrix $L_{n*m}^1 = W_{n*n} L_{n*m}^0$. The intermediate mapping matrix records intermediate mapping probabilities between the wireless hotspots and the POIs. The computer device resets the intermediate mapping probabilities between the seed hotspots and the corresponding POIs in the intermediate mapping matrix $L_{n*m}^1 = W_{n*n} L_{n*m}^0$ to an initial value, which is 1. The computer device normalizes intermediate mapping probabilities between to-be-mapped hotspots and the POIs in the intermediate mapping matrix $L_{n*m}^1 = W_{n*n} L_{n*m}^0$. The computer device uses the intermediate mapping matrix $L_{n*m}^1 = W_{n*n} L_{n*m}^0$ in which the intermediate mapping probabilities of the seed hotspots have been reset and the intermediate mapping probabilities of the to-be-mapped hotspots have been normalized as the initial mapping matrix for iteration, to obtain an intermediate mapping matrix $L_{n*m}^2 = W_{n*n} L_{n*m}^1$. After resetting of intermediate mapping probabilities of seed hotspots and normalization of intermediate mapping probabilities of to-be-mapped hotspots have been completed in the intermediate mapping matrix $L_{n*m}^2$, $L_{n*m}^2$ is used as the initial mapping matrix for continuous iteration, until an iteration end condition is met, to obtain the target mapping matrix $L_{n*m}^t = W_{n*n} L_{n*m}^{t-1}$.

Since the initial mapping probabilities between the seed hotspots and the corresponding POIs are reliable, it may be ensured that the mapping probabilities between the seed hotspots and the corresponding POIs are 1 from beginning to end by resetting during the process of the iterative propagation. Further, the highly reliable seed hotspots may be used as a propagation source for propagation, and the initial mapping probabilities of the seed hotspots are continuously propagated to surrounding to-be-mapped hotspots through iteration, thereby improving the accuracy of the mapping relationship.

In this embodiment, hotspot locations of the wireless hotspots recorded in the sniffing records may be biased, and the data reliability is poor. By limiting the distances between the wireless hotspots and the POIs to a relatively small threshold, seed hotspots that can be reliably mapped according to distances alone can be identified among a large number of to-be-mapped wireless hotspots. The initial mapping probabilities between the seed hotspots and the corresponding POIs are determined to be 1, and the initial mapping probabilities between the other wireless hotspots and each of the POIs are determined to be 0. In this way, the use of hotspot location data in the sniffing records can be reduced as much as possible. Instead, only the highly reliable seed hotspots are used as the propagation source for propagation, which improves the accuracy of the mapping relationship.

Figure 6:
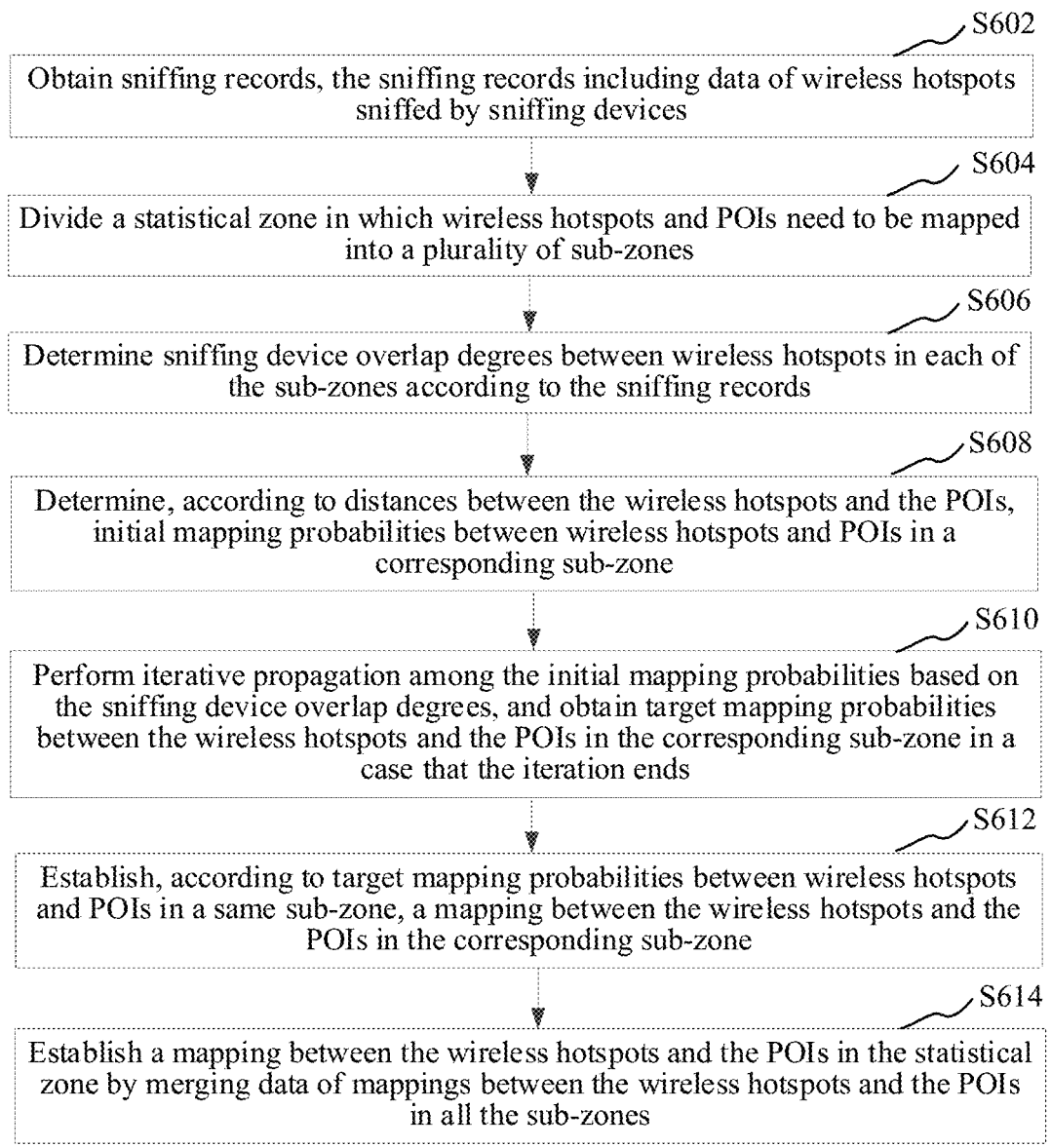
FIG. 6 is a flowchart of a method for mapping wireless hotspots and POIs according to still another exemplary embodiment.

In an embodiment, referring to FIG. 6, the foregoing method for mapping wireless hotspots and POIs includes:

S602: Obtain sniffing records, the sniffing records including data of wireless hotspots sniffed by sniffing devices.

S604: Divide a statistical zone in which wireless hotspots and POIs need to be mapped into a plurality of sub-zones.

S606: Determine sniffing device overlap degrees between wireless hotspots in each of the sub-zones according to the sniffing records.

S608: Determine, according to distances between the wireless hotspots and the POIs, initial mapping probabilities between wireless hotspots and POIs in a corresponding sub-zone.

S610: Perform iterative propagation among the initial mapping probabilities based on the sniffing device overlap degrees, and obtain target mapping probabilities between the wireless hotspots and the POIs in the corresponding sub-zone when the iteration ends.

S612: Establish, according to target mapping probabilities between wireless hotspots and POIs in a same sub-zone, a mapping between the wireless hotspots and the POIs in the corresponding sub-zone.

S614: Establish a mapping between the wireless hotspots and the POIs in the statistical zone by merging data of mappings between the wireless hotspots and the POIs in all the sub-zones.

When the statistical zone has a relatively small area and includes a relatively small number of POIs and wireless hotspots, the foregoing manner may be used to traverse and calculate the mapping relationship between each of the wireless hotspots and the POIs in the statistical zone. However, when the area of the statistical zone is relatively large, a quite large number of POIs and wireless hotspots are usually included. For example, the number of wireless hotspots and POIs in China is at a billion level. In order to implement an efficient mapping between wireless hotspots and POIs in a large-area statistical zone, the statistical zone is divided into a plurality of sub-zones in the embodiments of this disclosure.

Specifically, the area and boundary contour shape of each sub-zone may be different. The method for performing regional division on the statistical zone may specifically be that the computer device divides the statistical zone into a plurality of sub-zones with different areas and/or different boundary contour shapes according to population distribution and passenger flow under normal circumstances. It may be understood that, for a location with a large population or a large passenger flow, the location may be divided into sub-zones with a small area by constricting the regional boundary. For a location with a small population or a small passenger flow, the location may be divided into sub-zones with a large area by increasing the regional boundary. In this way, a similar number of wireless hotspots and POIs are included in each sub-zone.

Figure 7:
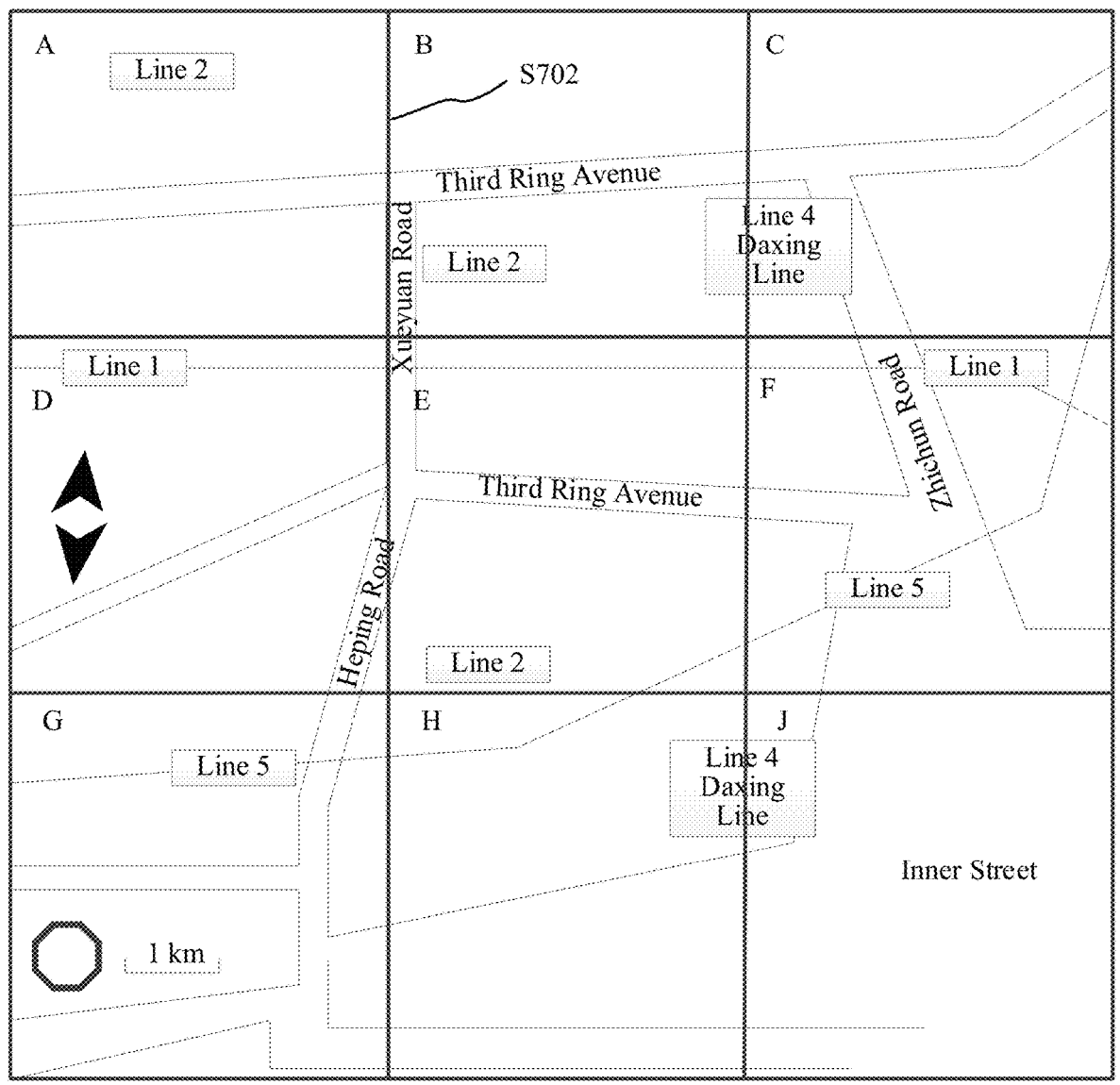
FIG. 7 is a schematic diagram of a statistical zone divided into a plurality of sub-zones according to an exemplary embodiment.

The area and boundary contour shape of each sub-zone may also be the same. The method for performing regional division on the statistical zone may specifically be that the computer device divides the statistical zone into a plurality of sub-zones with the same areas and/or different boundary contour shapes according to preset grids. Referring to FIG. 7, the computer device establishes a plane coordinate system in a digital map based on the ground where the statistical zone is. The plane coordinate system averagely divides the statistical zone into a plurality of sub-zones with an equal area based on a square grid 702 of a preset size. It may be understood that, the preset grid may alternatively be another regular polygon, such as a triangle, a parallelogram, a rhombus, or the like. The preset grid may alternatively have an irregular border. There may be no overlap area between different sub-zones, or a certain overlap area for transition may be set. A person skilled in the art may alternatively use another regional division method. Limitations are not made thereto.

Further, the computer device separately establishes the mapping between the wireless hotspots and the POIs in each sub-zone according to the foregoing manner, and combines the data of the mappings between the wireless hotspots and the POIs in all the sub-zones in the end, to obtain a complete mapping relationship between all the wireless hotspots and POIs in the statistical zone.

In this embodiment, the statistical zone is divided into a plurality of sub-zones. For each sub-zone, there is a relatively small amount of data of wireless hotspots and POIs that need to be mapped and processed. In addition, the wireless hotspots and the POIs in the plurality of sub-zones may be mapped synchronously, which greatly improves the mapping efficiency and makes the method for mapping wireless hotspots and POIs provided in this disclosure applicable to scenarios of large-area statistical zones.

Figure 8:
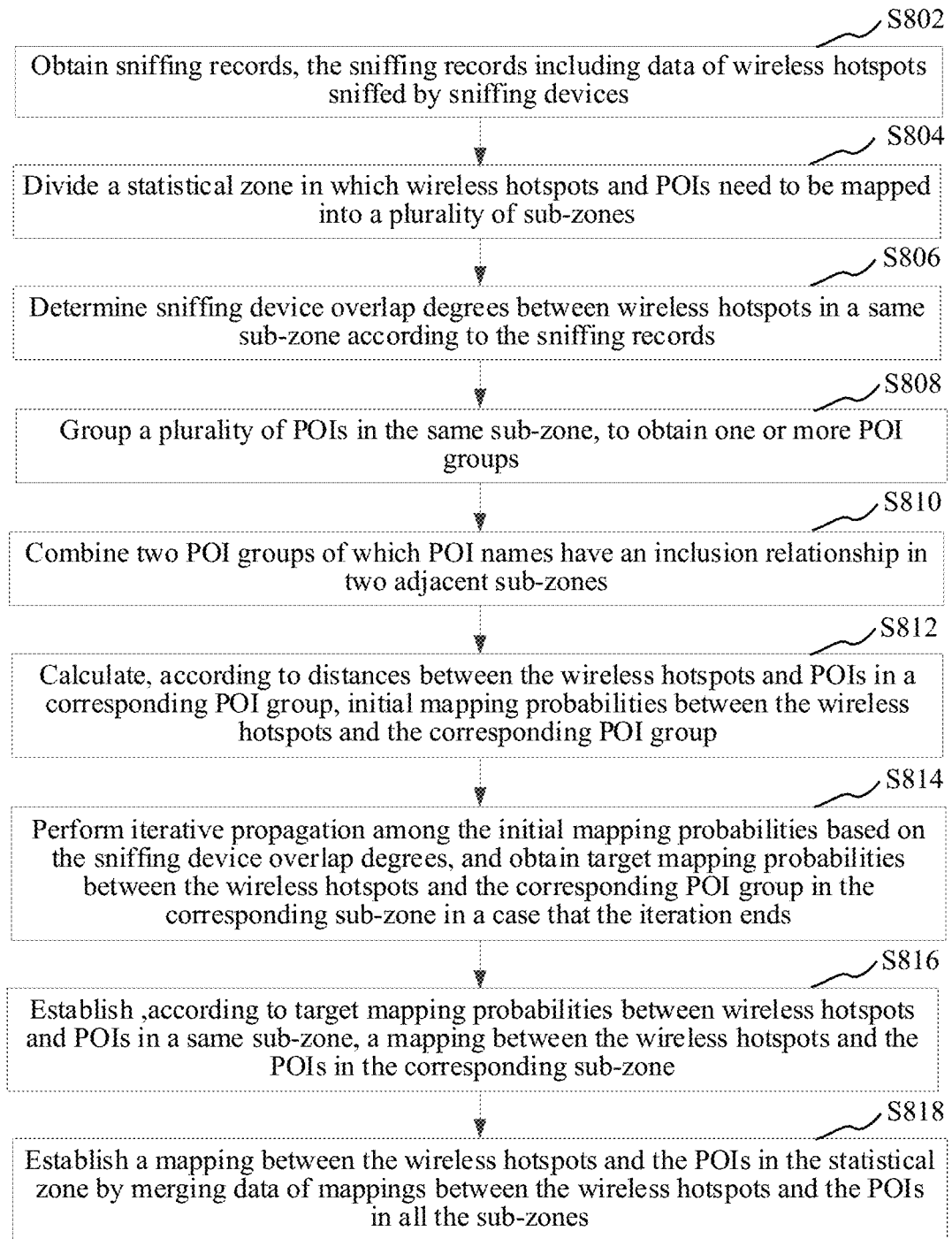
FIG. 8 is a flowchart of a method for mapping wireless hotspots and POIs according to yet another exemplary embodiment.

In an embodiment, referring to FIG. 8, the foregoing method for mapping wireless hotspots and POIs includes:

S802: Obtain sniffing records, the sniffing records including data of wireless hotspots sniffed by sniffing devices.

S804: Divide a statistical zone in which wireless hotspots and POIs need to be mapped into a plurality of sub-zones.

S806: Determine sniffing device overlap degrees between wireless hotspots in a same sub-zone according to the sniffing records.

S808: Group a plurality of POIs in the same sub-zone, to obtain one or more POI groups.

S810: Combine two POI groups of which POI names have an inclusion relationship in two adjacent sub-zones.

S812: Calculate, according to distances between the wireless hotspots and POIs in a corresponding POI group, initial mapping probabilities between the wireless hotspots and the corresponding POI group.

S814: Perform iterative propagation among the initial mapping probabilities based on the sniffing device overlap degrees, and obtain target mapping probabilities between the wireless hotspots and the corresponding POI group in the corresponding sub-zone when the iteration ends.

S816: Establish, according to target mapping probabilities between wireless hotspots and POIs in a same sub-zone, a mapping between the wireless hotspots and POIs in the corresponding sub-zone.

S818: Establish a mapping between the wireless hotspots and the POIs in the statistical zone by merging data of mappings between the wireless hotspots and the POIs in all the sub-zones.

The adjacent sub-zones may be two sub-zones with adjacent regional boundaries. In an embodiment, each sub-zone has corresponding location coordinates used for representing a location in the zone, such as the location coordinates of a center point. The adjacent sub-zones may alternatively be two sub-zones with a distance between location coordinates thereof less than a preset distance threshold. For example, in the statistical zone shown in FIG. 7, when the adjacent sub-zones are two sub-zones with adjacent regional boundaries, adjacent sub-zones corresponding to a sub-zone E include sub-zones B, D, F, and H. When the adjacent sub-zones are two sub-zones with a distance between location coordinates thereof less than the distance threshold, and the distance threshold is diagonal lengths of the sub-zones, the adjacent sub-zones corresponding to the sub-zone E include sub-zones A, B, C, D, F, G, H, and J.

Specifically, the computer device separately performs level division on POIs in each sub-zone according to the foregoing manner, to obtain one or more POI groups in each sub-zone. In an embodiment, the grouping a plurality of POIs in the same sub-zone, to obtain one or more POI groups includes: obtaining POI names of each POI in the same sub-zone; dividing a plurality of POIs of which the POI names have an inclusion relationship into a same POI group; and determining a POI corresponding to an included POI name as a parent POI in the POI group.

Further, after the regional division is performed and a POI level relationship in each sub-zone is determined, the computer device merges the POI groups in each sub-zone, to obtain a POI level relationship in the entire statistical zone. In an embodiment, the combining two POI groups of which POI names have an inclusion relationship in two adjacent sub-zones includes: when a POI name of a parent POI in a current sub-zone includes a POI name of a parent POI in an adjacent sub-zone, combining a POI group in which the parent POI in the current sub-zone is located into a POI group in which the corresponding parent POI in the adjacent sub-zone is located; and when the POI name of the parent POI in the current sub-zone is included in the POI name of the parent POI in the adjacent sub-zone, combining the POI group in which the parent POI in the adjacent sub-zone is located into the POI group in which the corresponding parent POI in the current sub-zone is located.

The computer device traverses each sub-zone, and identifies whether there is an inclusion relationship between POI names of all parent POIs in the current sub-zone and all parent POIs in the adjacent sub-zone of the current sub-zone. When a POI name of a parent POI POIi in a POI group in the current sub-zone is included in a POI name of a parent POI POIj in a POI group in the adjacent sub-zone, a POI group where the parent POI POIj is located is divided into a POI group where the parent POI POIi is located. When the POI name of the parent POI POIi in the POI group in the current sub-zone includes the POI name of the parent POI POIj in the POI group in the adjacent sub-zone, the POI group where the parent POI POIi is located is divided into the POI group where the parent POI POIj is located.

For example, there is a parent POI "Guangming Residential Unit" and a child POI set thereof {"Building 1, East Guangming Residential Unit", "Building 3, East Guangming Residential Unit", . . . } in the current sub-zone E, and there is a parent POI "West Guangming Miccrodistrict" and a child POI set thereof {"Building 1, West Guangming Residential Unit", "Building 2, West Guangming Residential Unit", . . . }. A parent POI after combination according to the foregoing manner is "Guangming Residential Unit", and a child POI set is {"Building 1, East Guangming Residential Unit", "Building 3, East Guangming Residential Unit", "Building 1, West Guangming Residential Unit", "Building 2, West Guangming Residential Unit", . . . }.

When two POI groups whose POI names have an inclusion relationship in the adjacent sub-zones are combined, the same POI group may be combined into different POI groups, and therefore the same POI may repeatedly appear in POI groups in different sub-zones. For example, in the foregoing example, a POI group {POIe} in the sub-zone E is combined into a POI group {POId} in the sub-zone D and a POI group {POIh} in the sub-zone H at the same time. Consequently, some POIs are repeated in {POId, POIe} and {POIh, POIe} after combination, thereby causing the problem of repeated mappings between the POIs and the wireless hotspots.

In order to resolve the foregoing problem, in the embodiments of this disclosure, when two POI groups whose POI names have an inclusion relationship in the adjacent sub-zones are combined, if it is found that one POI group may be combined into POI groups in a plurality of adjacent sub-zones, the computer device randomly combines the POI group into one of the POI groups in the adjacent sub-zones. Alternatively, each sub-zone has a corresponding number, and the POI group may be combined into a POI group in an adjacent sub-zone with the largest sub-zone number.

Further, after the POI level relationship of each sub-zone is determined by combining the POI groups, the computer device separately calculates the sniffing device overlap degrees between the wireless hotspots in each sub-zone according to the foregoing manner, and the initial mapping probabilities between the wireless hotspots and the POIs in each sub-zone. In an embodiment, the calculating, according to distances between the wireless hotspots and POIs in a POI group, initial mapping probabilities between the wireless hotspots and the corresponding POI group includes: selecting wireless hotspots with a distance from at least one POI in the POI group less than a preset value by screening as seed hotspots of the corresponding POI group; determining initial mapping probabilities between the seed hotspots and the corresponding POI group to be 1; and determining initial mapping probabilities between wireless hotspots other than the seed hotspots and the POI group to be 0.

If the POI level relationship is introduced, each POI group {POI} has a corresponding number. Assuming that the m POIs included in the statistical zone are divided into p POI groups, a range of numbers may be from 0 to p−1. In this way, the POI group numbers may be directly used as the column subscripts of the mapping matrix $L_{n*p}^0$.

The computer device traverses whether distances between each wireless hotspot $Wi\text{-}Fi_i$ and POIs in the POI group {POIj} are less than the preset value according to the POI group numbers. When the distances between each wireless hotspot $Wi\text{-}Fi_i$ and the POIs in the POI group {POIj} are greater than or equal to the preset value, the computer device sets initial mapping probabilities between the wireless hotspot $Wi\text{-}Fi_i$ and the POI group {POIj} to 0. When a distance between the wireless hotspot $Wi\text{-}Fi_i$ and at least one POI in the POI group {POIj} is less than the preset value, the computer device sets the initial mapping probabilities between the wireless hotspot $Wi\text{-}Fi_i$ and the POI group {POIj} to 1, and sets initial mapping probabilities between the wireless hotspot $Wi\text{-}Fi_i$ and POI groups {POIj+k} to 0. In other words, when the wireless hotspot $Wi\text{-}Fi_i$ is determined as the seed hotspot of a POI group {POIj}, there is no need to determine whether distances between the POI groups {POIj+k} after the POI group {POIj} and the wireless hotspot $Wi\text{-}Fi_i$ are less than the preset value. $j+k \leq p-1$.

The computer device iteratively propagates initial mapping probabilities of the seed hotspots in the corresponding sub-zone to the to-be-mapped hotspots based on the sniffing device overlap degrees between the wireless hotspots in each sub-zone, obtains target mapping probabilities between wireless hotspots and POIs in the corresponding sub-zone when the iteration ends, and establishes the mapping between the wireless hotspots and the POIs in the corresponding sub-zone according to the target mapping probabilities.

In this embodiment, the POI level relationship is introduced during the regional division of the statistical zone, which improves the mapping efficiency and extends the application scenarios of the embodiments of this disclosure. In addition, the recall rate of mapping the wireless hotspots Wi-Fi and the POIs. In other words, the embodiments of this disclosure can improve the precision and recall rate of the wireless hotspots and the POIs.

Figure 9:
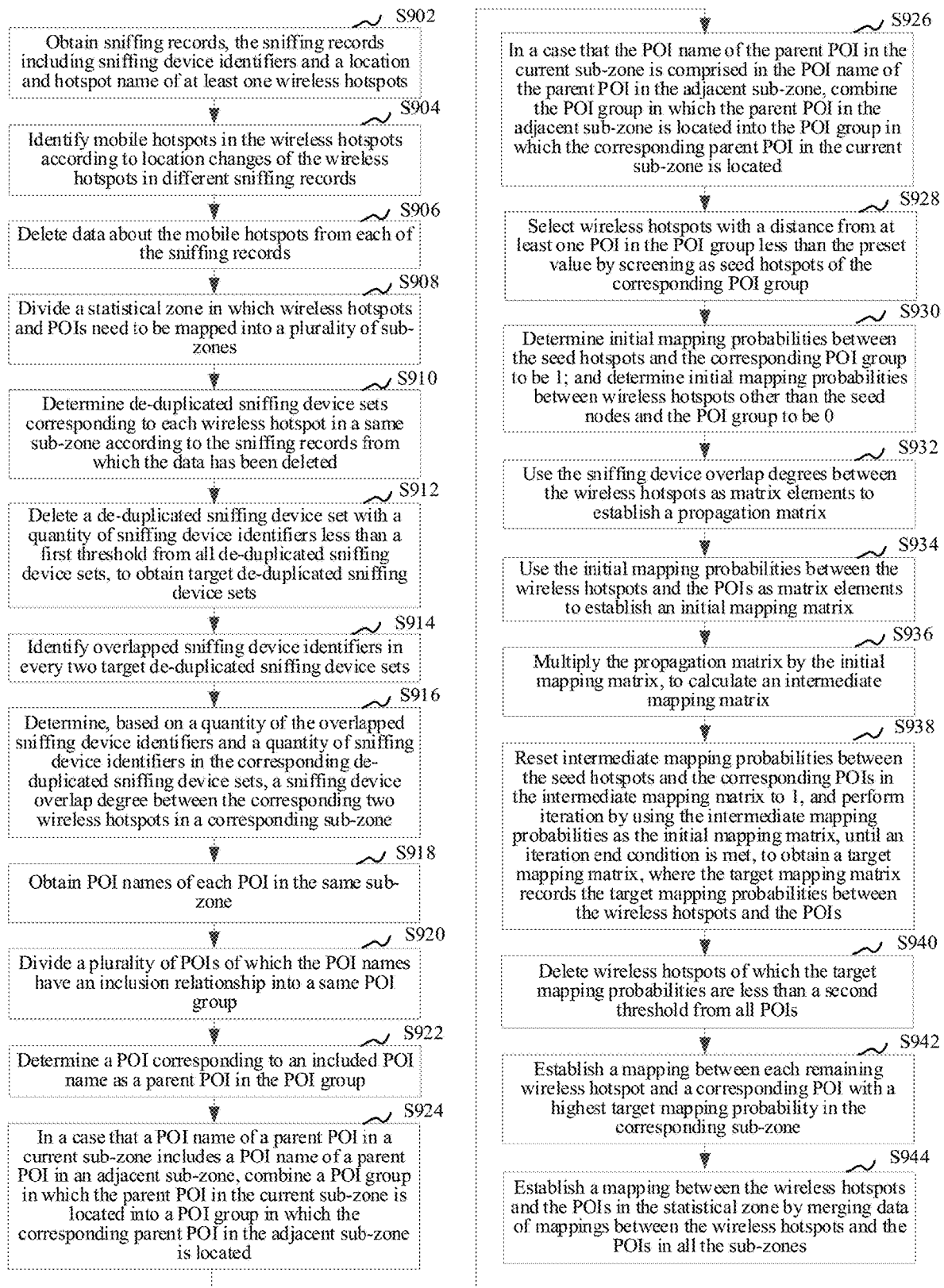
FIG. 9 is a flowchart of a method for mapping wireless hotspots and POIs according to a specific exemplary embodiment.

In a specific embodiment, referring to FIG. 9, the foregoing method for mapping wireless hotspots and POIs includes:

S902: Obtain sniffing records, the sniffing records including sniffing device identifiers and a location and hotspot name of at least one wireless hotspots.

S904: Identifying mobile hotspots in the wireless hotspots according to location changes of the wireless hotspots in different sniffing records.

S906: Delete data about the mobile hotspots from each of the sniffing records.

S908: Divide a statistical zone in which wireless hotspots and POIs need to be mapped into a plurality of sub-zones.

S910: Determine de-duplicated sniffing device sets corresponding to each wireless hotspot in a same sub-zone according to the sniffing records from which the data has been deleted.

S912: Delete a de-duplicated sniffing device set with a quantity of sniffing device identifiers less than a first threshold from all de-duplicated sniffing device sets, to obtain target de-duplicated sniffing device sets.

S914: Identify overlapped sniffing device identifiers in every two target de-duplicated sniffing device sets.

S916: Determine, based on a quantity of the overlapped sniffing device identifiers and a quantity of sniffing device identifiers in the corresponding de-duplicated sniffing device sets, a sniffing device overlap degree between the corresponding two wireless hotspots in a corresponding sub-zone.

S918: Obtain POI names of each POI in the same sub-zone.

S920: Divide a plurality of POIs of which the POI names have an inclusion relationship into a same POI group.

S922: Determine a POI corresponding to an included POI name as a parent POI in the POI group.

S924: When a POI name of a parent POI in a current sub-zone includes a POI name of a parent POI in an adjacent sub-zone, combine a POI group in which the parent POI in the current sub-zone is located into a POI group in which the corresponding parent POI in the adjacent sub-zone is located.

S926: When the POI name of the parent POI in the current sub-zone is included in the POI name of the parent POI in the adjacent sub-zone, combining the POI group in which the parent POI in the adjacent sub-zone is located into the POI group in which the corresponding parent POI in the current sub-zone is located.

S928: Select wireless hotspots with a distance from at least one POI in the POI group less than the preset value by screening as seed hotspots of the corresponding POI group.

S930: Determine initial mapping probabilities between the seed hotspots and the corresponding POI group to be 1; and determine initial mapping probabilities between wireless hotspots other than the seed hotspots and the POI group to be 0.

S932: Use the sniffing device overlap degrees between the wireless hotspots as matrix elements to establish a propagation matrix.

S934: Use the initial mapping probabilities between the wireless hotspots and the POIs as matrix elements to establish an initial mapping matrix.

S936: Multiply the propagation matrix by the initial mapping matrix, to calculate an intermediate mapping matrix.

S938: Reset intermediate mapping probabilities between the seed hotspots and the corresponding POIs in the intermediate mapping matrix to 1, and perform iteration by using the intermediate mapping probabilities as the initial mapping matrix, until an iteration end condition is met, to obtain a target mapping matrix, where the target mapping matrix records the target mapping probabilities between the wireless hotspots and the POIs.

S940: Delete wireless hotspots of which the target mapping probabilities are less than a second threshold from all POIs.

S942: Establish a mapping between each remaining wireless hotspot and a corresponding POI with a highest target mapping probability in the corresponding sub-zone.

S944: Establish a mapping between the wireless hotspots and the POIs in the statistical zone by merging data of mappings between the wireless hotspots and the POIs in all the sub-zones.

In the foregoing method for mapping wireless hotspots and POIs, the mapping relationship between the wireless hotspots and the POIs is established based on the sniffing records of the wireless hotspots. There is no need to manually collect and report POI visit data, which improves the mapping efficiency. In addition, due to the reduction of dependence on the wireless hotspots and the POI names, this mapping method is widely applicable, and the recall rate of the wireless hotspots is increased. The measurement of the relevance between the wireless hotspots based on the sniffing device overlap degrees can help to determine the mobility attribute of users among the POIs, and the spatial behavior feature information of the users is retained. As a result, differentiation of the wireless hotspots in terms of spatial location can be better implemented, so that the reflected relevance between the wireless hotspots is of higher reliability. Furthermore, the mapping between the wireless hotspots and the POIs is established by integrating the distances between the wireless hotspots and the POIs and the sniffing device overlap degrees between the wireless hotspots, which can improve the accuracy of the mapping.

Figure 10:
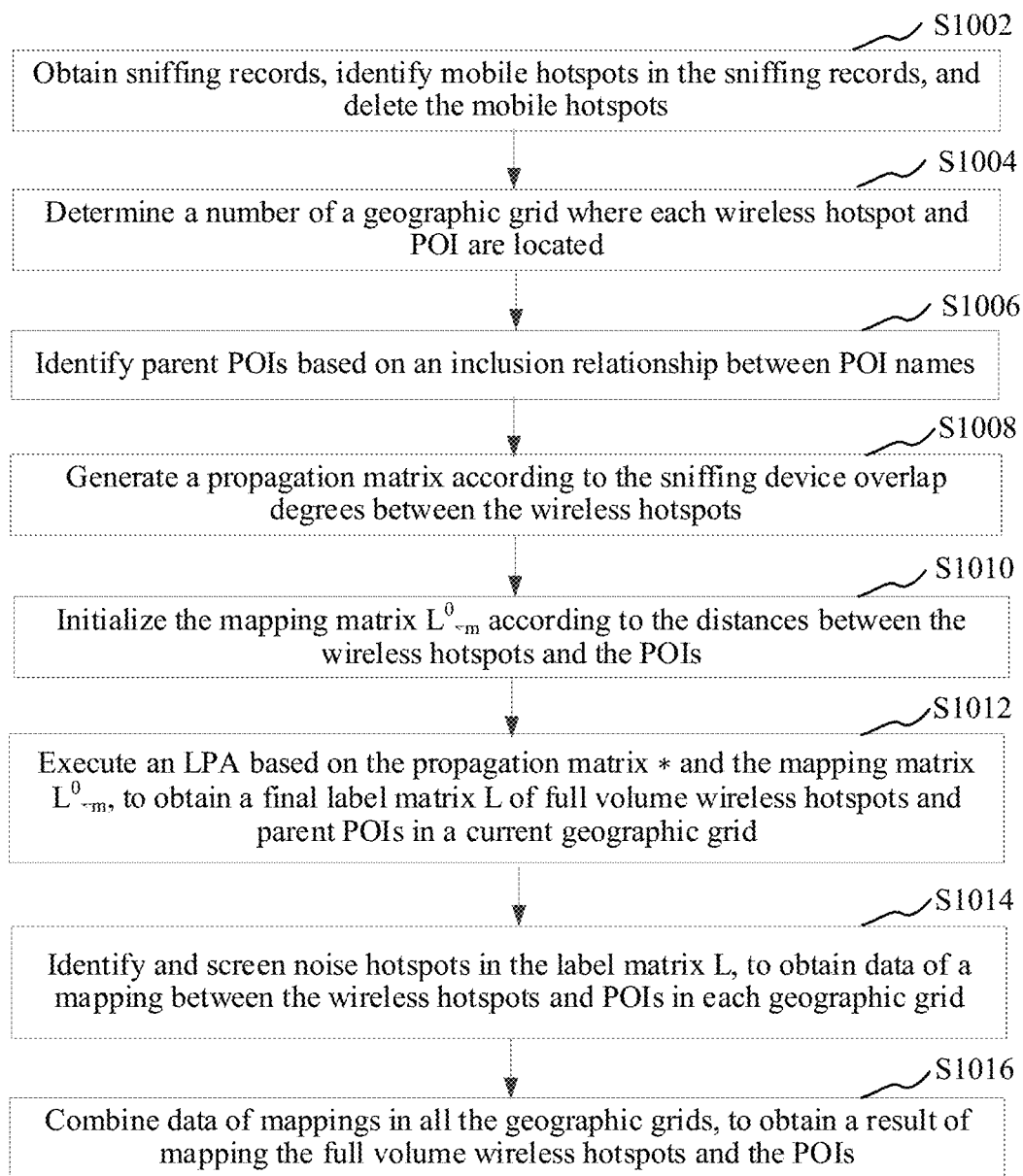
FIG. 10 is a flowchart of a method for mapping wireless hotspots and POIs according to another exemplary embodiment.

In a most specific embodiment, referring to FIG. 10, the foregoing method for mapping wireless hotspots and POIs includes:

S1002: Obtain sniffing records, identify mobile hotspots in the sniffing records, and delete the mobile hotspots.

The locations of the mobile hotspots vary over time, and a stable mapping relationship between the mobile hotspots and the POIs cannot be obtained. Therefore, the mobile hotspots need to be deleted. The identification of mobile or fixed hotspots may be implemented by deducing a series of location data of each wireless hotspot from sniffing records during a certain period. When a plurality of locations of a wireless hotspot change greatly, the wireless hotspot may be determined to be mobile, and vice versa to be fixed. The identification of mobile or fixed wireless hotspots may be implemented using other manners, which are not limited herein.

S1004: Determine a number of a geographic grid where each wireless hotspot and POI are located.

There are billions of wireless hotspots and POIs across China. It is unnecessary to traverse and calculate a mapping relationship between all wireless hotspots and POIs. A method adopted in this embodiment is to first perform grid division on the wireless hotspots and the POIs, then calculate a mapping relationship between the wireless hotspots and the POIs in each geographic grid, and finally perform merging to obtain a complete mapping result. Each geographic grid has a corresponding number. The numbers may be determined in the following manner: A two-dimensional coordinate system is established in a plane region containing a geographic region in which wireless hotspots and POIs need to be mapped. The geographic grid whose size is given may be a square grid with a side length of d meters. Each square grid has corresponding coordinates in the two-dimensional coordinate system, for example, the coordinates of a center point or vertex are (x, y). The numbers of the geographic grids corresponding to the wireless hotspots and the POIs are calculated in the following manner: (x, y)→ ([x/d]*d, [y/d]*d), where x is an abscissa, y is an ordinate, and [ ] is a rounding operation.

S1006: Identify parent POIs based on an inclusion relationship between POI names.

In reality, there is a level relationship between many POIs. Taking a residential unit-type POI "Runcheng Garden" as an example, there may be POIs such as "Building 1, Runcheng Garden" and "Building 9, Runcheng Garden" nearby. Data of each POI includes IDs, names, longitudes, latitudes, or the like. The steps of POI level division are as follows:

(1) Calculate geographic grids to which POIs belong according to longitudes and latitudes of the POIs.

(2) Traverse the geographic grids and perform calculations: When a name of a POI does not include a name of any other POI, the POI is set as a parent POI, and all POIs that contain the POI name are child POIs thereof.

(3) Traverse the geographic grids and perform calculations: In a nine-square division region centered on a current grid, all parent POIs in the current grid and all 8 geographic grids adjacent to the grid are obtained. When a name of a parent POIi in the current grid is included in a name of a parent POIj in the adjacent 8 grids, the POIj and child POIs of the POIj are divided into a child POI set of the POIi.

S1008: Generate a propagation matrix according to the sniffing device overlap degrees between the wireless hotspots.

A propagation matrix * is an n*n second-order matrix, where the row/column subscript n is the quantity of the wireless hotspots, an element at a location of [i, j] represents the relevance between Wi-Fi$_i$ and Wi-Fi$_j$, and a range of the value is [0, 1]. There are a plurality of methods for measuring the relevance between Wi-Fis, for example, based on distances between the Wi-Fis, and based on the number of times the Wi-Fis appear in the same sniffing record. This embodiment provides a method for measuring relevance between the wireless hotspots based on the sniffing device overlap degrees. Relevance calculated by this method is within a value range of [0,1] and do not need to be normalized. In addition, user's individual information is retained. In this way, the segmentation of a wireless hotspot relationship network can be better implemented. The steps for constructing a wireless hotspot relationship network are as follows:
  (1) The sniffing records of Wi-Fi (for example, in one month) are parsed to obtain the sniffing device sets of each wireless hotspot.
  (2) Wi-Fis with a number of sniffing devices less than a threshold in one month are deleted.
  (3) The propagation matrix * is initialized, and the default value of all elements is 0.
  (4) A sniffing user overlap degree $w_{i,j}$=(a quantity of de-duplicated sniffing devices of Wi-Fi$_i$+a quantity of de-duplicated sniffing devices of Wi-Fi$_j$−a quantity of de-duplicated sniffing devices of Wi-Fi$_i$ and Wi-Fi$_j$)/the quantity of de-duplicated sniffing devices of Wi-Fi$_i$.
  (5) A propagation matrix is returned.

S1010: Initialize the mapping matrix $L^0{}_{*m}$ according to the distances between the wireless hotspots and the POIs.

The mapping matrix $L^0{}_{*m}$ is an n*m second-order matrix, where the superscript 0 represents an initialized state, the row subscript n is the quantity of Wi-Fis, the column subscript m is the quantity of parent POIs of all POIs, and an element at the position of [i, j] represents the probability value of Wi-Fi$_i$ attributed to the parent POI. All elements of the mapping matrix $L^0{}_{*m}$ in the initialized state are 0 by default. A subscript value j=poi.parentid.no corresponding to the column is the number value of a parent POI of a current POI. The number starts from 0, and a maximum value is the quantity of parent POIs of all POIs minus 1.

The process of initializing the mapping matrix $L^0{}_{*m}$ is as follows: All parent POIs in the geographic grids are obtained and numbered from 0. All POIs (including the parent POIs and child POIs thereof) are traversed. When there is a wireless hotspot Wi-Fi$_i$ that satisfies Distance (wifii, poi)<a default distance threshold, $L_{i*j}$=1 is assigned to the elements of the mapping matrix. After the initialization, elements in a label matrix $L^0{}_{*m}$ include two values of 0 and 1, where 1 corresponds to the seed hotspots, and 0 corresponds to the to-be-mapped hotspots.

S1012: Execute an LPA based on the propagation matrix * and the mapping matrix $L^0{}_{*m}$, to obtain a final label matrix L of full volume wireless hotspots and parent POIs in a current geographic grid.

The steps to execute the semi-supervised LPA are as follows.
  (1) The propagation matrix * and the mapping matrix $L^0{}_{*m}$ are initialized.
  (2) Propagation is performed by using sniffing device overlap degrees between wireless hotspots recorded in the propagation matrix * as propagation weights, and the initial mapping probabilities between the seed hotspots and the corresponding POIs are propagated to surrounding to-be-mapped hotspots in the mapping matrix $L^0{}_{*m}$ according to the propagation weights and updated to probability distributions of the to-be-mapped hotspots, to obtain a mapping matrix $L^t = *L^{t-1}$.
  (3) The mapping probability values corresponding to the initialized seed hotspots in $L^t$ are reset to initial values.
  (4) Steps (2) and (3) are repeated until the mapping matrix L converges or a maximum number of iterations are reached.
  (5) The mapping matrix L is returned.

S1014: Identify and screen noise hotspots in the label matrix L, to obtain data of a mapping between the wireless hotspots and POIs in each geographic grid.

The iterative propagation ends, and a final label matrix $L_{*m}$ is obtained. Maximum element values of each row are calculated. When the maximum values are greater than a given screening threshold, the wireless hotspots are retained and a mapping relationship with POIs corresponding to the maximum values is established. Otherwise, the wireless hotspots are determined as noise hotspots and deleted.

S1016: Combine data of mappings in all the geographic grids, to obtain a result of mapping the full volume wireless hotspots and the POIs.

After the actual test, the quantity of wireless hotspots recalled in a range of 10 residential units at an accuracy over 80% exceeds 5000. In contrast, the quantity of wireless hotspots recalled using a conventional name-based mapping method is merely around 100, and the quantity of wireless hotspots recalled at the same accuracy using a location-based mapping method is merely around 2000. The mapping method provided in this disclosure is significantly better than the conventional name-based or location-based mapping method in terms of both accuracy and recall rate.

FIG. 2, FIG. 4, FIG. 6, FIG. 8, FIG. 9, and FIG. 10 are flowcharts of a method for mapping wireless hotspots and POIs according to an embodiment. It is to be understood that, although the steps in the flowcharts of FIG. 2, FIG. 4, FIG. 6, FIG. 8, FIG. 9, and FIG. 10 are sequentially displayed according to indication of arrows, the steps are not necessarily sequentially performed in the sequence indicated by the arrows. Unless otherwise explicitly specified in this disclosure, execution of the steps is not strictly limited, and the steps may be performed in other sequences. Moreover, at least some of the steps in FIG. 2, FIG. 4, FIG. 6, FIG. 8, FIG. 9, and FIG. 10 may include a plurality of sub-steps or a plurality of stages. These sub-steps or stages are not necessarily performed at the same moment, but may be performed at different moments. These sub-steps or stages are not necessarily executed sequentially, but may be performed in turn or alternately with another step or at least some of sub-steps or stages of the another step.

Figure 11:
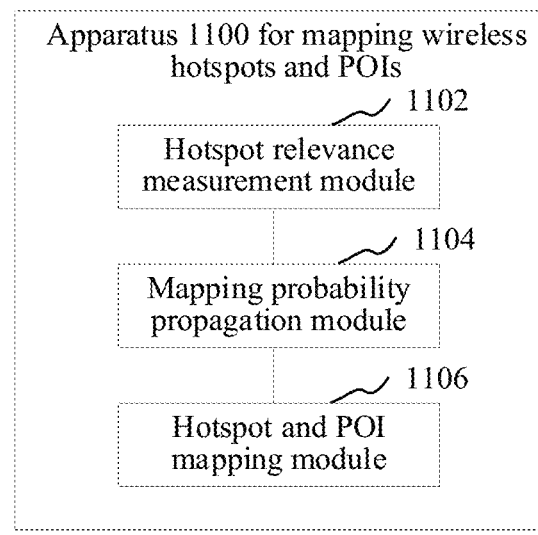
FIG. 11 is a structural block diagram of an apparatus for mapping wireless hotspots and POIs according to an exemplary embodiment.

As shown in FIG. 11, in an embodiment, an apparatus 1100 for mapping wireless hotspots and POIs is provided, including a hotspot relevance measurement module 1102, a mapping probability propagation module 1104, and a hotspot and POI mapping module 1106.

The hotspot relevance measurement module 1102 is configured to obtain sniffing records, the sniffing records including data of wireless hotspots sniffed by sniffing devices; and determine sniffing device overlap degrees according to the sniffing records.

The mapping probability propagation module 1104 is configured to, determine, according to distances between the wireless hotspots and corresponding POIs, initial mapping probabilities between the wireless hotspots and the corresponding POIs; and perform iterative propagation among the initial mapping probabilities based on the sniffing device overlap degrees, and obtain target mapping probabilities between the wireless hotspots and the POIs when the iteration ends.

The hotspot and POI mapping module 1106 is configured to establish a mapping between the wireless hotspots and the POIs according to the target mapping probabilities.

Figure 12:
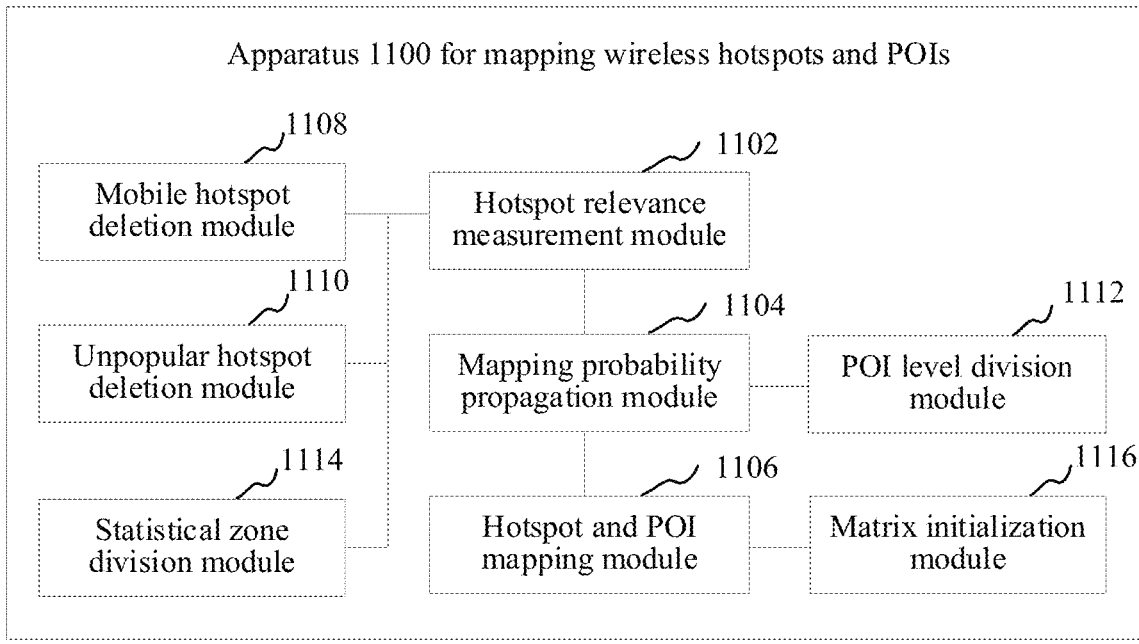
FIG. 12 is a structural block diagram of an apparatus for mapping wireless hotspots and POIs according to another exemplary embodiment.

In an embodiment, the data of the wireless hotspots includes locations of the wireless hotspots. Referring to FIG. 12, the foregoing apparatus 1100 for mapping wireless hotspots and POIs further includes a mobile hotspot deletion module 1108, configured to identify mobile hotspots in the wireless hotspots according to location changes of the wireless hotspots in different sniffing records; and delete data about the mobile hotspots from each of the sniffing records; and determining sniffing device overlap degrees between the wireless hotspots according to the sniffing records of the wireless hotspots includes: determining the sniffing device overlap degrees between the wireless hotspots according to the sniffing records from which the data has been deleted.

In an embodiment, the sniffing records include sniffing device identifiers and hotspot names of at least two wireless hotspots; and the hotspot relevance measurement module 1102 is further configured to determine de-duplicated sniffing device sets corresponding to each of the hotspot names based on the sniffing device identifiers; identify overlapped sniffing device identifiers in every two de-duplicated sniffing device sets; and determine, based on a quantity of the overlapped sniffing device identifiers and a quantity of sniffing device identifiers in the corresponding de-duplicated sniffing device sets, a sniffing device overlap degree between the corresponding two wireless hotspots.

In an embodiment, the foregoing apparatus 1100 for mapping wireless hotspots and POIs further includes an unpopular hotspot deletion module 1110, configured to delete de-duplicated sniffing device sets with a quantity of sniffing device identifiers less than a first threshold from all de-duplicated sniffing device sets, to obtain target de-duplicated sniffing device sets; and the hotspot relevance measurement module 1102, further configured to identify overlapped sniffing device identifiers in every two target de-duplicated sniffing device sets.

In an embodiment, the foregoing apparatus 1100 for mapping wireless hotspots and POIs further includes a POI level division module 1112, configured to obtain POI names of each to-be-mapped POI; and divide a plurality of POIs of which the POI names have an inclusion relationship into a same POI group; and the mapping probability propagation module 1104, further configured to calculate, according to distances between the wireless hotspots and POIs in a corresponding POI group, initial mapping probabilities between the wireless hotspots and the corresponding POI group.

In an embodiment, the mapping probability propagation module 1104 is further configured to select wireless hotspots with a distance from the POIs less than a preset value by screening as seed hotspots of the corresponding POIs; determine initial mapping probabilities between the seed hotspots and the corresponding POIs to be 1; and determine initial mapping probabilities between wireless hotspots other than the seed hotspots and the POIs to be 0.

In an embodiment, the foregoing apparatus 1100 for mapping wireless hotspots and POIs further includes a statistic zone division module 1114, configured to divide a statistical zone in which wireless hotspots and POIs need to be mapped into a plurality of sub-zones; the POI level division module 1112, further configured to group a plurality of POIs in the same sub-zone, to obtain one or more POI groups; and combine two POI groups of which POI names have an inclusion relationship in two adjacent sub-zones; and the mapping probability propagation module 1104, further configured to, calculate according to distances between the wireless hotspots and POIs in a corresponding POI group, initial mapping probabilities between the wireless hotspots and the corresponding POI group.

In an embodiment, the POI level division module 1112 is further configured to obtain POI names of each POI in the same sub-zone; divide a plurality of POIs of which the POI names have an inclusion relationship into a same POI group; and determine a POI corresponding to an included POI name as a parent POI in the POI group.

In an embodiment, the POI level division module 1112 is further configured to, when a POI name of a parent POI in a current sub-zone includes a POI name of a parent POI in an adjacent sub-zone, combine a POI group in which the parent POI in the current sub-zone is located into a POI group in which the corresponding parent POI in the adjacent sub-zone is located; and when the POI name of the parent POI in the current sub-zone is comprised in the POI name of the parent POI in the adjacent sub-zone, combine the POI group in which the parent POI in the adjacent sub-zone is located into the POI group in which the corresponding parent POI in the current sub-zone is located.

In an embodiment, the mapping probability propagation module 1104 is further configured to select wireless hotspots with a distance from at least one POI in the POI group less than the preset value by screening as seed hotspots of the corresponding POI group; determine initial mapping probabilities between the seed hotspots and the corresponding POI group to be 1; and determine initial mapping probabilities between wireless hotspots other than the seed hotspots and the POI group to be 0.

In an embodiment, the foregoing apparatus 1100 for mapping wireless hotspots and POIs further includes a matrix initialization module 1116, configured to use the sniffing device overlap degrees between the wireless hotspots as matrix elements to establish a propagation matrix; and use the initial mapping probabilities between the wireless hotspots and the POIs as matrix elements to establish an initial mapping matrix; and the mapping probability propagation module 1104, further configured to multiply the propagation matrix by the initial mapping matrix, to calculate an intermediate mapping matrix; and reset intermediate mapping probabilities between the seed hotspots and the corresponding POIs in the intermediate mapping matrix to 1, and perform iteration by using the intermediate mapping probabilities as the initial mapping matrix, until an iteration end condition is met, to obtain a target mapping matrix, where the target mapping matrix records the target mapping probabilities between the wireless hotspots and the POIs.

In an embodiment, the hotspot and POI mapping module 1106 is configured to delete wireless hotspots of which the target mapping probabilities are less than a second threshold from all POIs; and establish a mapping between each remaining wireless hotspot and a corresponding POI with a highest target mapping probability.

In an embodiment, the statistic zone division module 1114 is configured to divide a statistical zone in which wireless hotspots and POIs need to be mapped into a plurality of sub-zones; and the hotspot and POI mapping module 1106 is configured to, according to target mapping probabilities between wireless hotspots and POIs in a same sub-zone, establish a mapping between the wireless hotspots and POIs in the corresponding sub-zone; and establish a mapping between the wireless hotspots and the POIs in the statistical zone by merging data of mappings between the wireless hotspots and the POIs in all the sub-zones.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In the foregoing apparatus for mapping wireless hotspots and POIs, the mapping relationship between the wireless hotspots and the POIs is established based on the sniffing records of the wireless hotspots. There is no need to manually collect and report POI visit data, which improves the mapping efficiency. In addition, due to the reduction of dependence on the wireless hotspots and the POI names, this mapping method is widely applicable, and the recall rate of the wireless hotspots is increased. The measurement of the relevance between the wireless hotspots based on the sniffing device overlap degrees can help to determine the mobility attribute of users among the POIs, and the spatial behavior feature information of the users is retained. As a result, differentiation of the wireless hotspots in terms of spatial location can be better implemented, so that the reflected relevance between the wireless hotspots is of higher reliability. Furthermore, the mapping between the wireless hotspots and the POIs is established by integrating the distances between the wireless hotspots and the POIs and the sniffing device overlap degrees between the wireless hotspots, which can improve the accuracy of the mapping.

Figure 13:
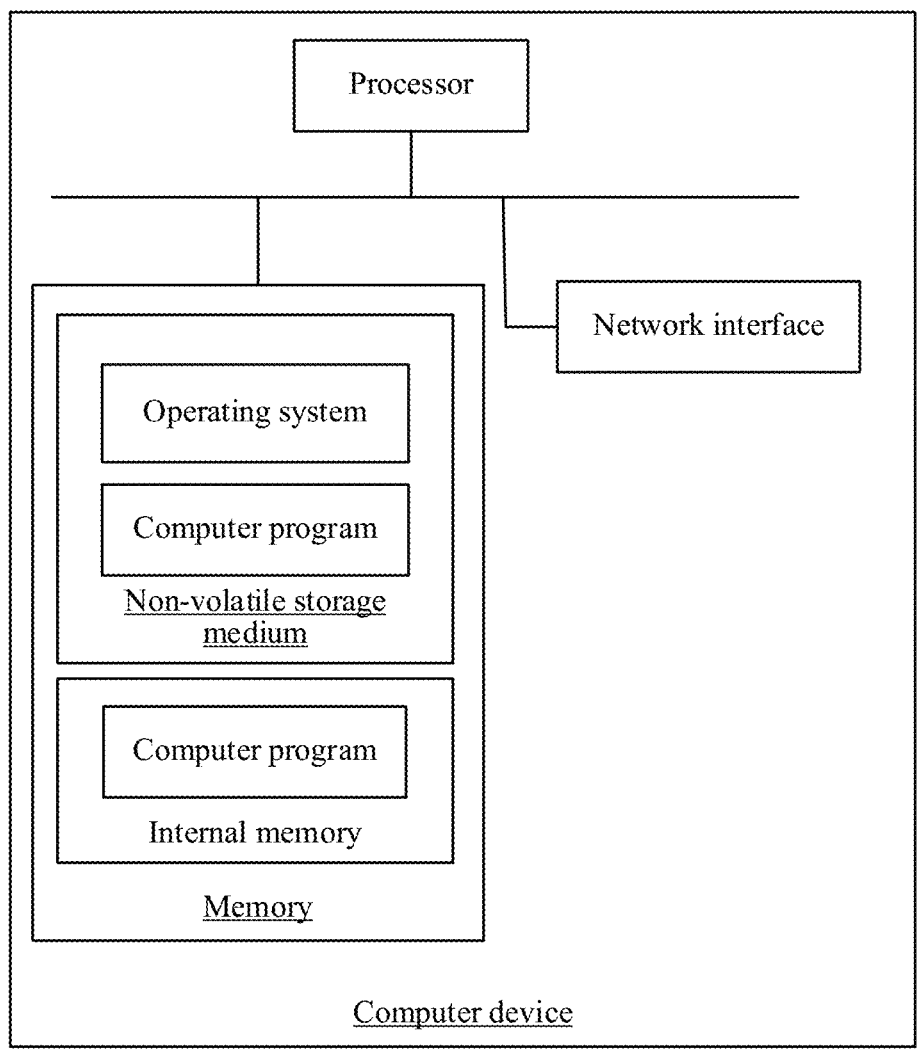
FIG. 13 is a structural block diagram of a computer device according to an exemplary embodiment.

FIG. 13 is a diagram of an internal structure of a computer device according to an embodiment. The computer device may be specifically the terminal 110 or the server 120 in FIG. 1. As shown in FIG. 13, the computer device includes a processor, a memory, and a network interface connected by using a system bus. The memory includes a non-transitory storage medium and an internal memory. The non-transitory storage medium of the computer device stores an operating system and may further store a computer program. The computer program, when executed by the processor, may cause the processor to implement the method for mapping wireless hotspots and POIs. The internal memory may also store a computer program. The computer program, when executed by the processor, may cause the processor to perform the method for mapping wireless hotspots and POIs.

A person skilled in the art may understand that the structure shown in FIG. 13 is only a block diagram of a partial structure related to the solution of this disclosure, and does not limit the computer device to which the solution of this disclosure is applied. Specifically, the computer device may include more or fewer components than those shown in the figure, or some components may be combined, or a different component deployment is used.

In an embodiment, the apparatus for mapping wireless hotspots and POIs provided in this disclosure may be implemented in the form of a computer program. The computer program may be run on the computer device shown in FIG. 13. A memory of the computer device may store program modules forming the apparatus for mapping wireless hotspots and POIs, for example, the relevance measurement module, the mapping probability propagation module, and the hotspot and POI mapping module shown in FIG. 11. The computer program formed by the program modules causes the processor to perform the steps of the method for mapping wireless hotspots and POIs in the embodiments of this disclosure that are described in this specification.

For example, the computer device shown in FIG. 13 may perform steps S202 and S204 by using the hotspot relevance measurement module in the apparatus for mapping wireless hotspots and POIs shown in FIG. 11. The computer device may perform steps S206 and S208 by using the mapping probability propagation module. The computer device may perform step S210 by using the hotspot and POI mapping module.

In an embodiment, a computer device is provided, including a memory and a processor, the memory storing a computer program, the computer program, when executed by the processor, causing the processor to perform steps of the method for mapping wireless hotspots and POIs. Herein, the steps of the method for mapping wireless hotspots and POIs may be the steps of the method for mapping wireless hotspots and POIs in the foregoing embodiments.

In an embodiment, a computer-readable non-transitory storage medium is provided, storing a computer program, the computer program, when executed by a processor, causing the processor to perform steps of the method for mapping wireless hotspots and POIs. Herein, the steps of the method for mapping wireless hotspots and POIs may be the steps of the method for mapping wireless hotspots and POIs in the foregoing embodiments.

In an embodiment, a computer program product or computer program is provided, the computer program product or computer program including computer instructions, and the computer instructions being stored in a computer-readable storage medium; and when a processor of an electronic device reads the computer instructions from the computer-readable non-transitory storage medium and executes the computer instructions, the electronic device is caused to perform steps of the method for mapping wireless hotspots and POIs.

A person of ordinary skill in the art may understand that all or some of the processes of the methods in the foregoing embodiments may be implemented by a computer program instructing relevant hardware. The program may be stored in a non-transitory computer-readable storage medium. When the program is executed, the processes of the foregoing method embodiments are performed. References to the memory, the storage, the database, or other medium used in the embodiments provided in this disclosure may all include a non-transitory or a volatile memory. The non-transitory memory may include a read-only memory (ROM), a programmable ROM (PROM), an electrically programmable ROM (EPROM), an electrically erasable programmable ROM (EEPROM), or a flash memory. The volatile memory may include a RAM or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

Technical features of the foregoing embodiments may be combined in different manners. To make description concise, not all possible combinations of the technical features in the foregoing embodiments are described. However, the combinations of these technical features shall be considered as falling within the scope recorded by this specification provided that no conflict exists.

The foregoing embodiments only show several implementations of this disclosure, and descriptions thereof are in detail, but cannot be understood as a limitation to the patent scope of this disclosure. It is to be noted that for a person of ordinary skill in the art, several transformations and improvements can be made without departing from the idea of this disclosure. These transformations and improvements belong to the protection scope of this disclosure. Therefore, the protection scope of the patent of this disclosure shall be subject to the appended claims.

What is claimed is:

1. A method for mapping wireless hotspots and points of interest (POIs), performed by a computer device, the method comprising:
    obtaining sniffing records, the sniffing records comprising wireless hotspot data for the wireless hotspots sniffed by sniffing devices, wherein each of the sniffing records comprises a corresponding sniffing device identifier and hotspot names of at least two wireless hotspots, the corresponding sniffing device identifier identifying a sniffing device associated with the each of the sniffing records;
    determining sniffing device sets corresponding to each of the wireless hotspots based on the sniffing device identifiers in the sniffing records;
    removing duplicated sniffing device within the each of the sniffing device set;
    identifying overlapped sniffing device in every two sniffing device sets;
    determining, based on a quantity of the overlapped sniffing device identifiers and a quantity of sniffing device identifiers in the corresponding sniffing device sets, a sniffing device overlap degree between the corresponding two wireless hotspots;
    determining, for each wireless hotspot, according to a distance between the each wireless hotspot and corresponding POIs, initial mapping probabilities between the each wireless hotspot and the corresponding POIs;
    performing iterative propagation among the initial mapping probabilities based on the sniffing device overlap degrees, and obtaining target mapping probabilities between the wireless hotspots and the corresponding POIs when the iteration ends; and
    establishing a mapping between the wireless hotspots and the POIs according to the target mapping probabilities.

2. The method according to claim 1, wherein:
    the wireless hotspot data comprises locations of the wireless hotspots;
    the method further comprises:
        identifying mobile hotspots in the wireless hotspots according to location changes of the wireless hotspots in different sniffing records; and
        deleting mobile hotspots records corresponding to the mobile hotspots from each of the sniffing records.

3. The method according to claim 1, further comprising: deleting all sniffing device sets with a size less than a first threshold from all the sniffing device sets, to obtain target sniffing device sets; and identifying overlapped sniffing device in every two sniffing device sets comprising: identifying overlapped sniffing device in every two target sniffing device sets.

4. The method according to claim 1, further comprising:
    obtaining POI names of each to-be-mapped POI;
    dividing a plurality of POIs of which the POI names have an inclusion relationship into a same POI group; and
    determining, according to distances between the wireless hotspots and corresponding POIs, initial mapping probabilities between the wireless hotspots and the corresponding POIs comprises:
        calculating, according to distances between the each wireless hotspot and POIs in a corresponding POI group, initial mapping probabilities between the wireless hotspots and the corresponding POI group.

5. The method according to claim 1, wherein determining, for the each wireless hotspot, according to the distances between the each wireless hotspot and the corresponding POIs, the initial mapping probabilities between the each wireless hotspot and the corresponding POIs comprises:
    selecting wireless hotspots with a distance to the POIs being less than a preset value as seed hotspots of the corresponding POIs;
    determining initial mapping probabilities between the seed hotspots and the corresponding POIs to be 1; and
    determining initial mapping probabilities between wireless hotspots other than the seed hotspots and the POIs to be 0.

6. The method according to claim 5, further comprising:
    using sniffing device overlap degrees between the wireless hotspots as matrix elements to establish a propagation matrix;
    using the initial mapping probabilities between the wireless hotspots and the POIs as matrix elements to establish an initial mapping matrix; and
    wherein performing the iterative propagation among the initial mapping probabilities based on the sniffing device overlap degrees, and obtaining the target mapping probabilities between the wireless hotspots and the POIs when the iteration ends comprises:
        multiplying the propagation matrix by the initial mapping matrix, to obtain an intermediate mapping matrix; and
        resetting intermediate mapping probabilities between the seed hotspots and the corresponding POIs in the intermediate mapping matrix to 1, and performing iteration by using the intermediate mapping probabilities as the initial mapping matrix, until an iteration end condition is met, to obtain a target mapping matrix, wherein the target mapping matrix records the target mapping probabilities between the wireless hotspots and the POIs.

7. The method according to claim 6, wherein establishing the mapping between the wireless hotspots and the POIs according to the target mapping probabilities comprises:
    deleting wireless hotspots of which the target mapping probabilities are less than a second threshold from all POIs; and
    establishing the mapping between each remaining wireless hotspot and a corresponding POI with a highest target mapping probability.

8. The method according to claim 1, further comprising:
dividing a statistical zone in which wireless hotspots and POIs need to be mapped into a plurality of sub-zones;
grouping a plurality of POIs in a same sub-zone, to obtain one or more POI groups;
combining two POI groups of which POI names have an inclusion relationship in two adjacent sub-zones; and
wherein determining, for the each wireless hotspot, according to the distance between the each wireless hotspot and the corresponding POIs, the initial mapping probabilities between the each wireless hotspot and the corresponding POIs comprising:
calculating, according to distances between the each wireless hotspot and the POIs in a corresponding POI group, initial mapping probabilities between the each wireless hotspot and the corresponding POI group.

9. The method according to claim 8, wherein:
grouping the plurality of POIs in the same sub-zone, to obtain the one or more POI groups comprises:
obtaining POI name of each POI in the same sub-zone; and
dividing a plurality of POIs of which the POI names have an inclusion relationship into a same POI group; and
the method further comprises:
in response to a POI name of a POI being included in another POI name of another POI in the POI group, determining the POI as a parent POI in the POI group.

10. The method according to claim 9, wherein the combining the two POI groups of which the POI names have an inclusion relationship in the two adjacent sub-zones comprises:
in responses to a POI name of a parent POI in a current sub-zone including a POI name of a parent POI in an adjacent sub-zone, combining a POI group in which the parent POI in the current sub-zone is located into a POI group in which the corresponding parent POI in the adjacent sub-zone is located; and
in responses to the POI name of the parent POI in the current sub-zone being included in the POI name of the parent POI in the adjacent sub-zone, combining the POI group in which the parent POI in the adjacent sub-zone is located into the POI group in which the corresponding parent POI in the current sub-zone is located.

11. The method according to claim 8, wherein calculating, for the each wireless hotspot, according to the distances between the each wireless hotspot and the POIs in the corresponding POI group, initial mapping probabilities between the each wireless hotspot and the corresponding POI group comprises:
selecting a wireless hotspot with a distance to at least one POI in the POI group being less than a preset value as seed hotspot of the corresponding POI group;
determining initial mapping probabilities between the seed hotspot and the corresponding POI group to be 1; and
determining initial mapping probabilities between wireless hotspots other than the seed hotspots and the corresponding POI group to be 0.

12. The method according to claim 1, further comprising:
dividing a statistical zone in which wireless hotspots and POIs need to be mapped into a plurality of sub-zones; and
wherein establishing the mapping between the wireless hotspots and the POIs according to the target mapping probabilities comprising:
establishing, according to target mapping probabilities between wireless hotspots and POIs in a same sub-zone, a mapping between the wireless hotspots and the POIs in the same sub-zone; and
establishing the mapping between the wireless hotspots and the POIs in the statistical zone by merging data of mappings between the wireless hotspots and the POIs in all the sub-zones.

13. A apparatus for mapping wireless hotspots and points of interest (POIs), comprising a memory for storing computer instructions and a processor in communication with the memory, wherein, when the processor executes the computer instructions, the processor is configured to cause the apparatus to:
obtain sniffing records, the sniffing records comprising wireless hotspot data for the wireless hotspots sniffed by sniffing devices, wherein each of the sniffing records comprises a corresponding sniffing device identifier and hotspot names of at least two wireless hotspots, the corresponding sniffing device identifier identifying a sniffing device associated with the each of the sniffing records;
determine sniffing device sets corresponding to each of the wireless hotspots based on the sniffing device identifiers in the sniffing records;
remove duplicated sniffing device within the each of the sniffing device set;
identify overlapped sniffing device in every two sniffing device sets;
determine, based on a quantity of the overlapped sniffing device identifiers and a quantity of sniffing device identifiers in the corresponding sniffing device sets, a sniffing device overlap degree between the corresponding two wireless hotspots;
determine, for each wireless hotspot, according to a distance between the each wireless hotspot and corresponding POIs, initial mapping probabilities between the each wireless hotspot and the corresponding POIs;
perform iterative propagation among the initial mapping probabilities based on the sniffing device overlap degrees, and obtaining target mapping probabilities between the wireless hotspots and the corresponding POIs when the iteration ends; and
establish a mapping between the wireless hotspots and the POIs according to the target mapping probabilities.

14. The apparatus according to claim 13, wherein:
the wireless hotspot data comprises locations of the wireless hotspots;
when the processor executes the computer instructions, the processor is configured to further cause the apparatus to:
identify mobile hotspots in the wireless hotspots according to location changes of the wireless hotspots in different sniffing records; and
delete mobile hotspots records corresponding to the mobile hotspots from each of the sniffing records.

15. The apparatus according to claim 13, wherein: when the processor executes the computer instructions, the processor is configured to further cause the apparatus to: delete all sniffing device sets with a size less than a first threshold from all the sniffing device sets, to obtain target sniffing device sets; and when the processor is configured to cause the apparatus to identify overlapped sniffing device in every two sniffing device sets, the processor is configured to cause the apparatus to: identify overlapped sniffing device in every two target sniffing device sets.

16. The apparatus according to claim 13, wherein:
when the processor executes the computer instructions, the processor is configured to further cause the apparatus to:
obtain POI names of each to-be-mapped POI;
divide a plurality of POIs of which the POI names have an inclusion relationship into a same POI group; and
when the processor is configured to cause the apparatus to determine, according to distances between the wireless hotspots and corresponding POIs, initial mapping probabilities between the wireless hotspots and the corresponding POIs, the processor is configured to cause the apparatus to:
calculate, according to distances between the each wireless hotspot and POIs in a corresponding POI group, initial mapping probabilities between the wireless hotspots and the corresponding POI group.

17. The apparatus according to claim 13, wherein, when the processor is configured to cause the apparatus to determine, for the each wireless hotspot, according to the distances between the each wireless hotspot and the corresponding POIs, the initial mapping probabilities between the each wireless hotspot and the corresponding POIs, the processor is configured to cause the apparatus to:
select wireless hotspots with a distance to the POIs being less than a preset value as seed hotspots of the corresponding POIs;
determine initial mapping probabilities between the seed hotspots and the corresponding POIs to be 1; and
determine initial mapping probabilities between wireless hotspots other than the seed hotspots and the POIs to be 0.

18. A non-transitory storage medium for storing computer readable instructions, the computer readable instructions, when executed by a processor in a device, causing the processor to:
obtain sniffing records, the sniffing records comprising wireless hotspot data for the wireless hotspots sniffed by sniffing devices, wherein each of the sniffing records comprises a corresponding sniffing device identifier and hotspot names of at least two wireless hotspots, the corresponding sniffing device identifier identifying a sniffing device associated with the each of the sniffing records;
determine sniffing device sets corresponding to each of the wireless hotspots based on the sniffing device identifiers in the sniffing records;
remove duplicated sniffing device within the each of the sniffing device set;
identify overlapped sniffing device in every two sniffing device sets;
determine, based on a quantity of the overlapped sniffing device identifiers and a quantity of sniffing device identifiers in the corresponding sniffing device sets, a sniffing device overlap degree between the corresponding two wireless hotspots;
determine, for each wireless hotspot, according to a distance between the each wireless hotspot and corresponding POIs, initial mapping probabilities between the each wireless hotspot and the corresponding POIs;
perform iterative propagation among the initial mapping probabilities based on the sniffing device overlap degrees, and obtaining target mapping probabilities between the wireless hotspots and the corresponding POIs when the iteration ends; and
establish a mapping between the wireless hotspots and the POIs according to the target mapping probabilities.

* * * * *